United States Patent
Satoh et al.

(10) Patent No.: US 11,644,715 B2
(45) Date of Patent: May 9, 2023

(54) LIQUID CRYSTAL DISPLAY DEVICE COMPRISING A PLURALITY OF PIXELS EACH HAVING A REFLECTIVE REGION WITH A REFLECTIVE ELECTRODE AND A TRANSMISSIVE REGION WITH A TRANSPARENT ELECTRODE

(71) Applicant: Sharp Display Technology Corporation, Kameyama (JP)

(72) Inventors: Takashi Satoh, Kameyama (JP); Takahiro Sasaki, Kameyama (JP); Hiroyuki Hakoi, Kameyama (JP); Ming Ni, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 17/859,075

(22) Filed: Jul. 7, 2022

(65) Prior Publication Data
US 2023/0015072 A1 Jan. 19, 2023

(30) Foreign Application Priority Data

Jul. 8, 2021 (JP) .............................. JP2021-113380
Jun. 3, 2022 (JP) .............................. JP2022-090705

(51) Int. Cl.
*G02F 1/1335* (2006.01)
*G02F 1/1333* (2006.01)
(Continued)

(52) U.S. Cl.
CPC .. *G02F 1/133555* (2013.01); *G02F 1/133345* (2013.01); *G02F 1/133769* (2021.01); *G02F 1/136227* (2013.01); *G02F 2201/123* (2013.01)

(58) Field of Classification Search
CPC ......... G02F 1/133769; G02F 1/133371; G02F 2203/09; G02F 2201/34
See application file for complete search history.

(56) References Cited

U.S. PATENT DOCUMENTS

| 8,692,758 B2 | 4/2014 | Matsuda et al. |
| 2007/0076148 A1* | 4/2007 | Yang ................. G02F 1/133555 349/114 |

(Continued)

FOREIGN PATENT DOCUMENTS

| JP | 2000-122094 A | 4/2000 |
| JP | 3394926 B2 | 4/2003 |

(Continued)

*Primary Examiner* — Paul C Lee
(74) *Attorney, Agent, or Firm* — Keating & Bennett, LLP

(57) ABSTRACT

A liquid crystal display device includes a first substrate; a second substrate; and a vertical alignment-type liquid crystal layer. The first substrate includes a backplane circuit, a first interlayer insulating layer covering the backplane circuit, a first reflective electrode provided on the first interlayer insulating layer and including a first region located in each of pixels and a second region located between any two adjacent pixels, a second interlayer insulating layer covering the first reflective electrode, and a pixel electrode provided on the second interlayer insulating layer in each pixel. The pixel electrode is electrically connected with the backplane circuit in first and second contact holes formed in the first and second interlayer insulating layers. The first substrate further includes a second reflective electrode provided on the second interlayer insulating layer so as to overlap the first contact hole as seen in a direction normal to a display surface.

19 Claims, 10 Drawing Sheets

(51) Int. Cl.
  *G02F 1/1337* (2006.01)
  *G02F 1/1362* (2006.01)

(56) References Cited

U.S. PATENT DOCUMENTS

| | | | | |
|---|---|---|---|---|
| 2007/0195241 A1* | 8/2007 | Lim | ................ | G02F 1/133555 349/114 |
| 2007/0222925 A1* | 9/2007 | Park | ................ | G02F 1/133555 349/114 |
| 2008/0143911 A1* | 6/2008 | Jin | ................ | G02F 1/134336 349/48 |
| 2008/0198310 A1* | 8/2008 | Kim | ................ | G02F 1/133555 349/106 |
| 2010/0279445 A1* | 11/2010 | Shin | ................ | G02F 1/133555 257/E21.158 |
| 2010/0295841 A1 | 11/2010 | Matsuda et al. | | |
| 2013/0320334 A1 | 12/2013 | Yamazaki et al. | | |

FOREIGN PATENT DOCUMENTS

| | | |
|---|---|---|
| JP | 2003-131268 A | 5/2003 |
| JP | 3469663 B2 | 11/2003 |
| JP | 5036864 B2 | 9/2012 |
| JP | 2014-007399 A | 1/2014 |

\* cited by examiner

LIQUID CRYSTAL DISPLAY DEVICE COMPRISING A PLURALITY OF PIXELS EACH HAVING A REFLECTIVE REGION WITH A REFLECTIVE ELECTRODE AND A TRANSMISSIVE REGION WITH A TRANSPARENT ELECTRODE

BACKGROUND

1. Technical Field

The present disclosure relates to a liquid crystal display device, and specifically, to a liquid crystal display device including pixels each including a reflective region.

2. Description of the Related Art

In general, liquid crystal display devices are roughly classified into transmissive liquid crystal display devices and reflective liquid crystal display devices. A transmissive liquid crystal display device provides display in a transmissive mode using light that is output from a backlight unit. A reflective liquid crystal display device provides display in a reflective mode using ambient light. Another type of liquid crystal display device has been proposed, which includes pixels each including a reflective region providing display in a reflective mode and a transmissive region providing display in a transmissive mode. Such a liquid crystal display device is referred to as a "transflective liquid crystal display device" or a "transmissive and reflective liquid crystal display device".

Reflective liquid crystal display devices and transflective liquid crystal display devices are preferably used as, for example, middle- or small-sized display devices of mobile devices usable outdoors. A reflective liquid crystal display device is disclosed in, for example, Japanese Laid-Open Patent Publication No. 2000-122094. A transflective liquid crystal display device is disclosed in, for example, Japanese Laid-Open Patent Publication No. 2003-131268.

SUMMARY

Such reflective and transflective liquid crystal display devices, namely, liquid crystal display devices including pixels each of which includes a region providing display in a reflective mode (reflective region), are desired to improve the light utilization factor (reflectance) in display in the reflective mode (that is, are desired to be capable of providing brighter display in the reflective mode).

One non-limiting and exemplary embodiment of the present invention made in light of the above-described situation provides a technique to improve the reflectance and thus to realize brighter display as compared with the conventional art, in a liquid crystal display device including pixels each of which includes a reflective region providing display in the reflective mode.

An embodiment of the present invention provides the solution to the problem specified in the following items.

[Item 1]
A liquid crystal display device, comprising:
a first substrate;
a second substrate facing the first substrate; and
a vertical alignment-type liquid crystal layer provided between the first substrate and the second substrate,
the liquid crystal display device including a plurality of pixels arranged in a matrix including a plurality of rows and a plurality of columns,
wherein the plurality of pixels each include a reflective region providing display in a reflective mode,
wherein the first substrate includes:
a substrate,
a backplane circuit provided on the substrate, the backplane circuit driving the plurality of pixels,
a first interlayer insulating layer provided so as to cover the backplane circuit,
a first reflective electrode provided on the first interlayer insulating layer, the first reflective electrode including a first region located in each of the plurality of pixels and a second region located between any two pixels adjacent to each other among the plurality of pixels,
a second interlayer insulating layer provided so as to cover the first reflective electrode, and
a pixel electrode formed of a transparent conductive material, the pixel electrode being provided on the second interlayer insulating layer in each of the plurality of pixels,
wherein the pixel electrode is electrically connected with the backplane circuit in a first contact hole formed in the first interlayer insulating layer and a second contact hole formed in the second interlayer insulating layer, and
wherein the first substrate further includes a second reflective electrode provided on the second interlayer insulating layer so as to overlap the first contact hole as seen in a direction normal to a display surface.

[Item 2]
The liquid crystal display device of item 1, wherein the first reflective electrode has a concaved and convexed surface structure in each of the first region and the second region.

[Item 3]
The liquid crystal display device of item 2, wherein the second reflective electrode has a concaved and convexed surface structure.

[Item 4]
The liquid crystal display device of item 1, further comprising a light scattering layer located on a viewer side with respect to the liquid crystal layer.

[Item 5]
The liquid crystal display device of item 4, wherein neither the first reflective electrode nor the second reflective electrode has a concaved and convexed surface structure.

[Item 6]
The liquid crystal display device of item 5,
wherein the first substrate further includes a third reflective electrode provided on the first interlayer insulating layer so as to overlap the second contact hole as seen in the direction normal to the display surface, and
wherein the third reflective electrode does not have a concaved and convexed surface structure.

[Item 7]
The liquid crystal display device of any one of items 1 through 6, wherein the second reflective electrode is electrically connected with the pixel electrode.

[Item 8]
The liquid crystal display device of any one of items 1 through 7,
wherein each of the plurality of pixels further includes a transmissive region providing display in a transmissive mode, and
wherein a portion of the pixel electrode is located in the transmissive region.

[Item 9]

The liquid crystal display device of any one of items 1 through 8, wherein the backplane circuit includes a memory circuit connected with each of the plurality of pixels.

[Item 10]

A liquid crystal display device, comprising:
a first substrate;
a second substrate facing the first substrate; and
a vertical alignment-type liquid crystal layer provided between the first substrate and the second substrate,
the liquid crystal display device including a plurality of pixels arranged in a matrix including a plurality of rows and a plurality of columns,
wherein the plurality of pixels each include a reflective region providing display in a reflective mode,
wherein the first substrate includes:
a substrate,
a backplane circuit provided on the substrate, the backplane circuit driving the plurality of pixels,
a first interlayer insulating layer provided so as to cover the backplane circuit,
a first reflective electrode provided on the first interlayer insulating layer, the first reflective electrode including a first region located in each of the plurality of pixels and a second region located between any two pixels adjacent to each other among the plurality of pixels,
a second interlayer insulating layer provided so as to cover the first reflective electrode, and
a pixel electrode formed of a transparent conductive material, the pixel electrode being provided on the second interlayer insulating layer in each of the plurality of pixels,
wherein the pixel electrode is electrically connected with the backplane circuit in a first contact hole formed in the first interlayer insulating layer and a second contact hole formed in the second interlayer insulating layer, and
wherein the first substrate further includes:
a third interlayer insulating layer provided in the second contact hole, and
a second reflective electrode provided on the third interlayer insulating layer so as to overlap at least the second contact hole as seen in a direction normal to a display surface.

[Item 11]

The liquid crystal display device of item 10,
wherein the second contact hole and the third interlayer insulating layer overlap the first contract hole as seen in the direction normal to the display surface, and
wherein the second reflective electrode also overlaps the first contact hole as seen in the direction normal to the display surface.

[Item 12]

The liquid crystal display device of item 10 or 11, wherein the first reflective electrode has a concaved and convexed surface structure in each of the first region and the second region.

[Item 13]

The liquid crystal display device of item 12, wherein the second reflective electrode has a concaved and convexed surface structure.

[Item 14]

The liquid crystal display device of item 10 or 11, further comprising a light scattering layer located on a viewer side with respect to the liquid crystal layer.

[Item 15]

The liquid crystal display device of item 14, wherein neither the first reflective electrode nor the second reflective electrode has a concaved and convexed surface structure.

[Item 16]

The liquid crystal display device of any one of items 10 through 15, wherein the second reflective electrode is electrically connected with the pixel electrode.

[Item 17]

The liquid crystal display device of any one of items 10 through 16, wherein the plurality of pixels each include a transmissive region providing display in a transmissive mode.

[Item 18]

The liquid crystal display device of item 17 wherein the transmissive region is not light-shielded by the backplane circuit.

[Item 19]

The liquid crystal display device of any one of items 10 through 18, wherein the backplane circuit includes a memory circuit connected with each of the plurality of pixels.

An embodiment of the present invention improves the reflectance and thus realizes brighter display as compared with the conventional art, in a liquid crystal display device including pixels each of which includes a reflective region providing display in a reflective mode.

DETAILED DESCRIPTION

Hereinafter, embodiments of the present invention will be described with reference to the drawings. The present invention is not limited to any of the following embodiments.

Embodiment 1

Figure 1:
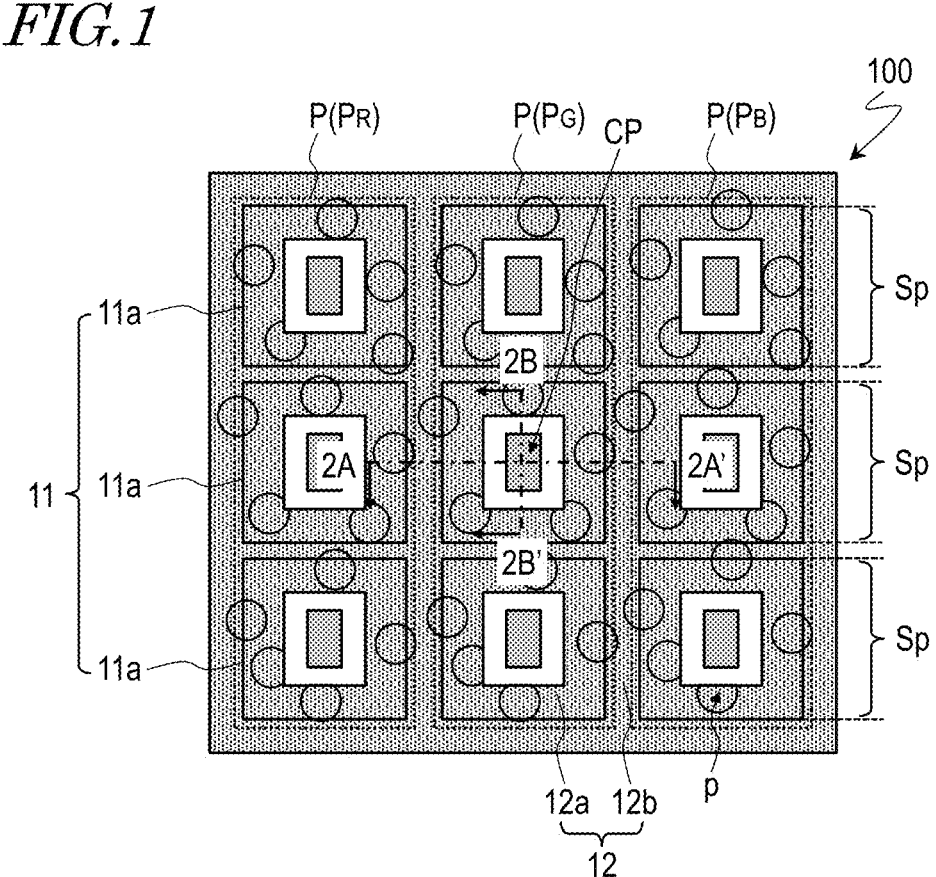
FIG. 1 is a plan view schematically showing a liquid crystal display device 100 according to an embodiment of the present invention, and shows a region corresponding to three pixels P of the liquid crystal display device 100.
Figure 2A:
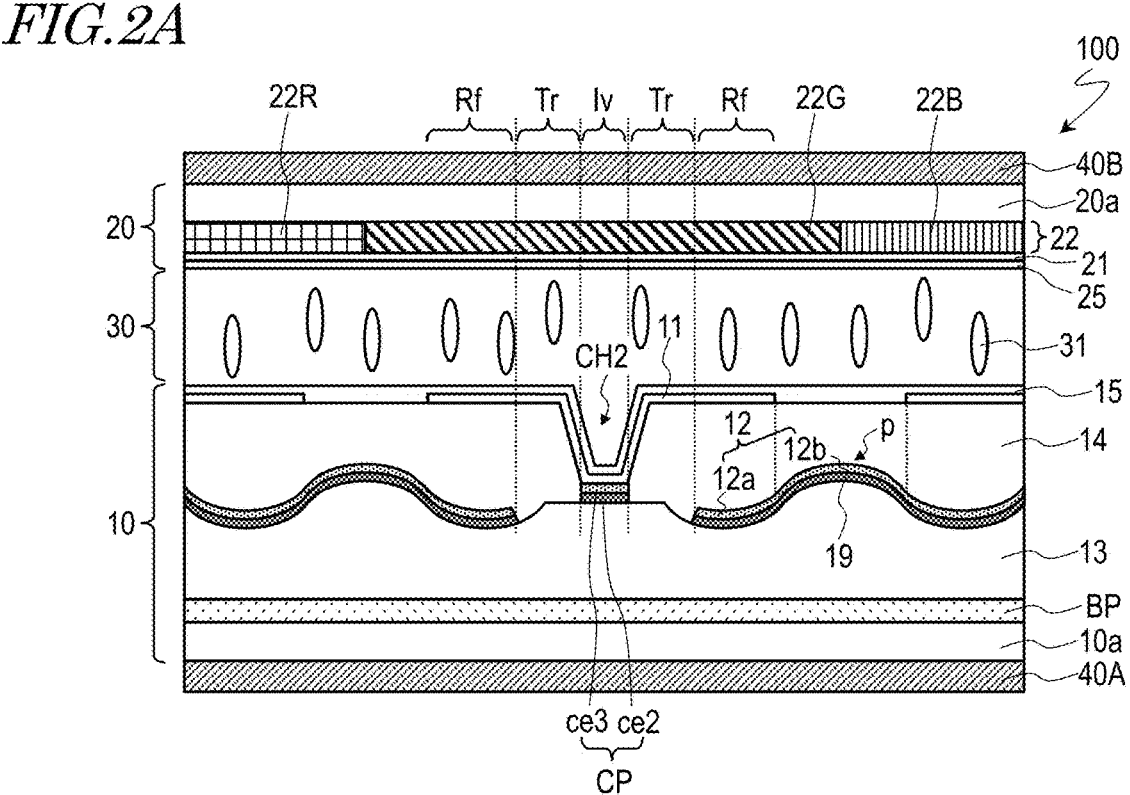
FIG. 2A is a cross-sectional view schematically showing the liquid crystal display device 100, and shows a cross-sectional structure taken along line 2A-2A' in FIG. 1.
Figure 2B:
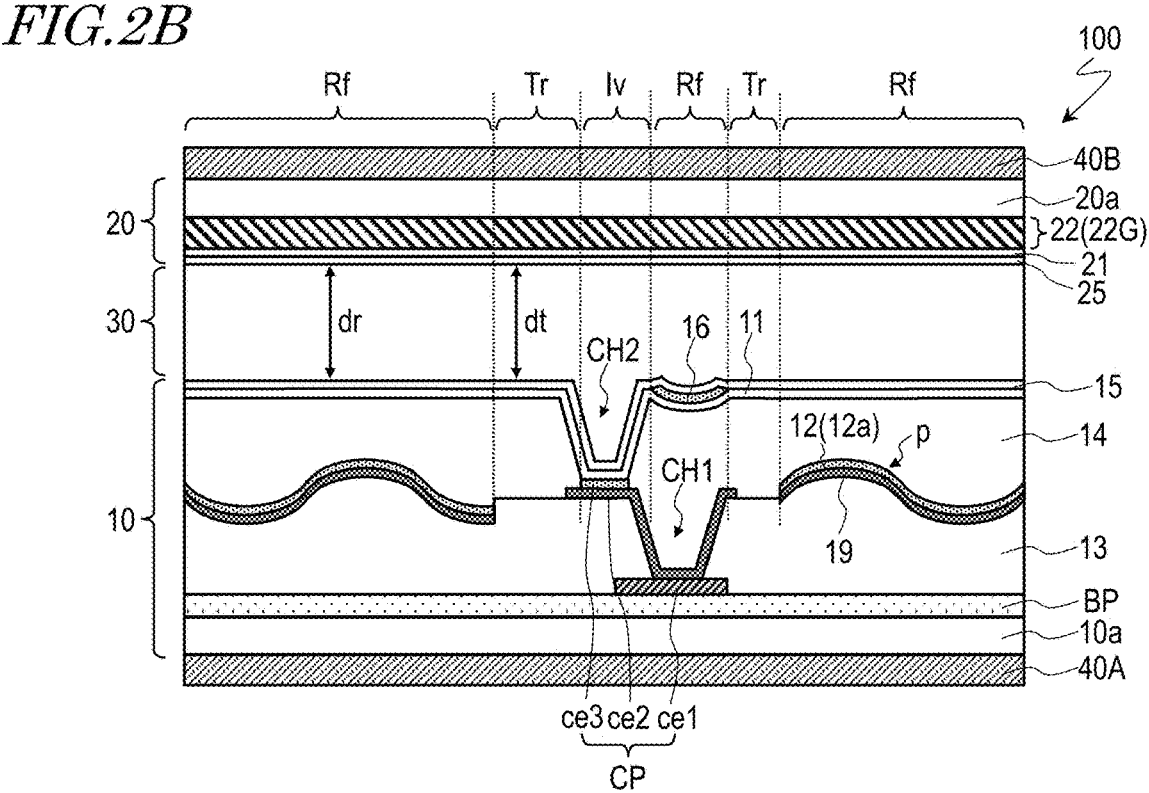
FIG. 2B is a cross-sectional view schematically showing the liquid crystal display device 100, and shows a cross-sectional structure taken along line 2B-2B' in FIG. 1.

With reference to FIG. 1, FIG. 2A and FIG. 2B, a liquid crystal display device 100 in this embodiment will be described. The liquid crystal display device 100 in this embodiment is a transflective (transmissive and reflective) liquid crystal display device. FIG. 1 is a plan view schematically showing the liquid crystal display device 100, and shows a region corresponding to three pixels P of the liquid crystal display device 100. FIG. 2A and FIG. 2B are cross-sectional views schematically showing the liquid crystal display device 100, and respectively show cross-sectional structures taken along line 2A-2A' and line 2B-2B' in FIG. 1.

As shown in FIG. 1, the liquid crystal display device 100 includes a plurality of pixels P. The plurality of pixels P are arranged in a matrix including a plurality of rows and a plurality of columns. The plurality of pixels P typically include red pixels $P_R$ displaying red, green pixels $P_G$ displaying green, and blue pixels $P_B$ displaying blue.

As shown in FIG. 2A and FIG. 2B, the liquid crystal display device 100 includes a TFT substrate (first substrate) 10, a counter substrate (second substrate) 20 facing the TFT substrate 10, and a vertical alignment-type liquid crystal layer 30 provided between the TFT substrate 10 and the counter substrate 20. The pixels P each include a reflective region Rf providing display in a reflective mode and a transmissive region Tr providing display in a transmissive mode. In the example shown in FIG. 2A and FIG. 2B, a thickness (cell gap) dt of the liquid crystal layer 30 in the transmissive region Tr and a thickness (cell gap) dr of the liquid crystal layer 30 in the reflective region Rf are equal to each other (i.e., dt=dr). The ratio of the area size of the transmissive region Tr with respect to the pixel P may be appropriately set in accordance with the use or the like, and is, for example, 20% or higher and 90% or lower. The position and the shape of the transmissive region Tr in the pixel P may be appropriately set in accordance with the use or the like. In this specification, a region Iv in the pixel P that does not contribute to the display in the reflective mode or the display in the transmissive mode may be referred to as an "invalid region".

The TFT substrate 10 includes a substrate 10a, a backplane circuit BP, a first interlayer insulating layer 13, a first reflective electrode 12, a second interlayer insulating layer 14, and a pixel electrode 11.

The substrate 10a supports the backplane circuit BP and the like. The substrate 10a is transparent and insulating. The substrate 10a is, for example, a glass substrate or a plastic substrate.

The backplane circuit BP is provided on the substrate 10a. The backplane circuit BP is a circuit that drives the plurality of pixels P. In this example, the backplane circuit BP includes a memory circuit (e.g., SRAM) connected with each of the plurality of pixels P. Such a liquid crystal display device in which a memory circuit is provided for each of the plurality of pixels P may be referred to as a "memory liquid crystal display device". A specific structure of a memory liquid crystal display device is disclosed in, for example, Japanese Patent No. 5036864 (corresponding to U.S. Pat. No. 8,692,758). The entire contents of Japanese Patent No. 5036864 and U.S. Pat. No. 8,692,758 are hereby incorporated by reference.

The first interlayer insulating layer 13 is provided so as to cover the backplane circuit BP. The first interlayer insulating layer 13 has a surface having a concaved and convexed shape. That is, the first interlayer insulating layer 13 has a concaved and convexed surface structure. The first interlayer insulating layer 13 having the concaved and convexed surface structure may be formed of a photosensitive resin as described in, for example, Japanese Patent No. 3394926.

The first reflective electrode 12 is provided on the first interlayer insulating layer 13. The first reflective electrode 12 is formed of a metal material having a high reflectance. In this example, a silver alloy is used as the metal material forming the first reflective electrode 12. The first reflective electrode 12 is not limited to being formed of a silver alloy, and may be formed of, for example, aluminum or an aluminum alloy.

The first reflective electrode 12 has a surface having a concaved and convexed shape that reflects the concaved and convexed surface structure of the first interlayer insulating layer 13. That is, the first reflective electrode 12 also has a concaved and convexed surface structure. The concaved and convexed surface structure of the first reflective electrode 12 is provided in order to provide diffused reflection of ambient light to realize display close to paper white. The concaved and convexed surface structure may include a plurality of convexed portions p that are located randomly such that, for example, the distance between the centers of adjacent convexed portions p is 5 µm or longer and 50 µm or shorter, preferably 10 µm or longer and 20 µm or shorter. As seen in a direction normal to the substrate 10a, the convexed portions p are generally circular or generally polygonal. The ratio of the area size of the convexed portions p with respect to the pixel P is, for example, about 20% to about 40%. The convexed portions p have a height of, for example, 1 µm or higher and 5 µm or lower.

The first reflective electrode 12 includes a first region 12a located in each of the plurality of pixels P and a second region 12b located between any two pixels P adjacent to each other. The concaved and convexed surface structure of the first reflective electrode 12 is formed in each of the first region 12a and the second region 12b. That is, the first region 12a and the second region 12b both have the concaved and convexed surface structure.

The second interlayer insulating layer 14 is provided so as to cover the first reflective electrode 12. The second interlayer insulating layer 14 is transparent and insulating.

The pixel electrode 11 is provided in each of the plurality of pixels P. The pixel electrode 11 is provided on the second interlayer insulating layer 14. That is, the pixel electrode 11 is located on the first reflective electrode 12, with the second interlayer insulating layer 14 (transparent insulating layer) being located between the pixel electrode 11 and the first reflective electrode 12. In other words, the first reflective electrode 12 is located on the side opposite to the liquid crystal layer 30, with the pixel electrode 11 being located between the first reflective electrode 12 and the liquid crystal layer 30 (that is, the first reflective electrode 12 is located closer to a rear surface of the liquid crystal display device 100 than the pixel electrode 11).

The pixel electrode 11 is formed of a transparent conductive material. The transparent conductive material may be, for example, indium tin oxide (ITO), indium zinc oxide (IZO (registered trademark)), or a mixture thereof. The pixel electrode 11 is electrically connected with the backplane circuit BP including the memory circuits. A portion of the pixel electrode 11 is located in the transmissive region Tr, and another portion of the pixel electrode 11 is located in the reflective region Rf.

The TFT substrate 10 further includes a contact portion CP, a second reflective electrode 16, and a first alignment film 15.

The contact portion CP electrically connects the pixel electrode 11 and the backplane circuit BP to each other in a first contact hole CH1 formed in the first interlayer insulating layer 13 and a second contact hole CH2 formed in the second interlayer insulating layer 14. In the example shown in FIG. 2B, the contact portion CP includes a first contact electrode ce1, a second contact electrode ce2 and a third contact electrode ce3.

The first contact electrode ce1 is an electrode (or a portion of a wire) exposed to an inner space of the first contact hole CH1. The second contact electrode ce2 is formed on the first interlayer insulating layer 13 and in the first contact hole CH1, and is connected with the first contact electrode ce1 in the first contact hole CH1. A portion of the second contact electrode ce2 is exposed to an inner space of the second contact hole CH2. The third contact electrode ce3 is connected with the second contact electrode ce2 and the pixel electrode 11 in the second contact hole CH2. In other words, the third contact electrode ce3 is located between the second contact electrode ce2 and the pixel electrode 11. In this example, the first contact electrode ce1 is formed of a metal material and is non-transparent. The second contact electrode ce2 is formed of a transparent conductive material (namely, is transparent). The third contact electrode ce3 is formed of a metal film that is also used to form the first reflective electrode 12 (that is, formed in the same layer as the first reflective electrode 12), and is non-transparent. In the example shown in FIG. 2A and FIG. 2B, a conductive layer 19 formed of a transparent conductive film also used to form the second contact electrode ce2 (that is, formed in the same layer as the second contact electrode ce2) is located between the first reflective electrode 12 and the first interlayer insulating layer 13. The conductive layer 19 may be omitted.

The second reflective electrode 16 is provided on the second interlayer insulating layer 14. The second reflective electrode 16 is located so as to overlap the first contact hole CH1 as seen in a direction normal to a display surface of the liquid crystal display device 100. The second reflective electrode 16 is formed so as to contact the pixel electrode 11, and is electrically connected with the pixel electrode 11. In the example shown in FIG. 2B, the second reflective electrode 16 is formed on the pixel electrode 11. Alternatively, the second reflective electrode 16 may be formed below the pixel electrode 11 (that is, between the second interlayer insulating layer 14 and the pixel electrode 11).

The second reflective electrode 16 is formed of a metal material having a high reflectance. In this example, a silver alloy is used as the metal material forming the second reflective electrode 16. The second reflective electrode 16 is not limited to being formed of a silver alloy, and may be formed of, for example, aluminum or an aluminum alloy.

The second interlayer insulating layer 14 has a concaved and convexed surface structure in a portion thereof overlapping the first contact hole CH1. The second interlayer insulating layer 14 having the concaved and convexed surface structure may be formed of a photosensitive resin, like the first interlayer insulating layer 13.

The pixel electrode 11 has a concaved and convexed shape, reflecting the concaved and convexed surface structure of the second interlayer insulating layer 14, in a portion thereof overlapping the first contact hole CH1. That is, the pixel electrode 11 also has a concaved and convexed surface structure.

The second reflective electrode 16 has a concaved and convexed shape that reflects the concaved and convexed surface structure of the pixel electrode 11. That is, the second reflective electrode 16 also has a concaved and convexed surface structure. The concaved and convexed surface structure of the second reflective electrode 16 is also provided in order to provide diffused reflection of ambient light to realize display close to paper white. The positional arrangement, the shape and the like of the convexed portions included in the concaved and convexed surface structure of the second reflective electrode 16 may be substantially the same as those of the convexed portions p of the first reflective electrode 12.

The counter substrate 20 includes a substrate 20a, a color filter layer 22, a counter electrode (common electrode) 21, and a second alignment film 25. Although not shown, the counter substrate 20 further includes a plurality of column-like spacers.

The substrate 20a supports the color filter layer 22 and the like. The substrate 20a is transparent and insulating. The substrate 20a is, for example, a glass substrate or a plastic substrate.

The color filter layer 22 typically includes a red color filter 22R provided in a region corresponding to the red pixel $P_R$, a green color filter 22G provided in a region corresponding to the green pixel $P_G$, and a blue color filter 22B provided in a region corresponding to the blue pixel $P_B$. The red color filter 22R, the green color filter 22G and the blue color filter 22B respectively transmit red light, green light and blue light. The counter substrate 20 does not include a black matrix (light-blocking layer) between any two pixels P adjacent to each other.

The counter electrode 21 is provided so as to face the pixel electrode 11 and the first reflective electrode 12. The counter electrode 21 is formed of a transparent conductive material. The material used to form the counter electrode 21 may be substantially the same as any of the materials usable to form the pixel electrode 11.

The column-like spacers define the thickness (cell gap) of the liquid crystal layer 30. The column-like spacers may be formed of a photosensitive resin.

The liquid crystal layer 30 contains a nematic liquid crystal material having negative dielectric anisotropy and a chiral agent. The liquid crystal layer 30 may be formed by, for example, a dripping method.

The first alignment film 15 and the second alignment film 25 are each provided so as to contact the liquid crystal layer 30. In this example, the first alignment film 15 and the second alignment film 25 are each a vertical alignment film. At least one of the first alignment film 15 and the second alignment film 25 is alignment-treated and defines a pretilt direction. Liquid crystal molecules 31 in the liquid crystal layer 30 are vertically aligned (see FIG. 2A) in a state where no voltage is applied to the liquid crystal layer 30, and fall to be twisted-aligned when a predetermined voltage is applied to the liquid crystal layer 30. As can be seen, the liquid crystal layer 30 is a vertical alignment-type liquid crystal layer.

The liquid crystal display device 100 further includes a pair of circularly polarized plates 40A and 40B and an illumination device (backlight unit) not shown. One of the pair of circularly polarized plates 40A and 40B, specifically, a first circularly polarized plate 40A, is located on a rear surface side of the TFT substrate 10. The other circularly polarized plate, specifically, a second circularly polarized plate 40B, is located on a viewer side of the counter substrate 20. The illumination device is located on a rear surface side of the first circularly polarized plate 40A.

The liquid crystal display device 100 described in this example has a structure that provides grayscale display as a memory liquid crystal display device. Specifically, as shown in FIG. 1, the pixels P of the liquid crystal display device 100 are each divided into a plurality of sub pixels Sp. FIG. 1 shows an example in which each pixel P is divided into three sub pixels Sp. In this example, each pixel electrode 11 is divided into three sub pixel electrodes 11a. Among the three sub pixel electrodes 11a, two sub pixel electrodes 11a at the top and at the bottom in FIG. 1 are electrically connected with one common memory circuit. The sub pixel electrode 11a at the center in FIG. 1 is electrically connected with another one memory circuit. That is, two memory circuits are provided for each pixel P.

Figure 3:
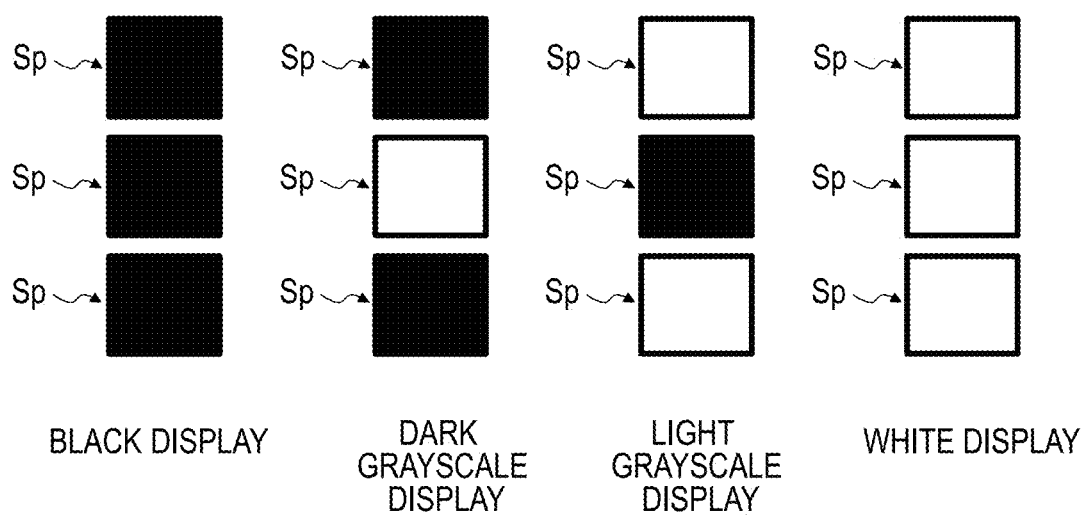
FIG. 3 shows examples of grayscale display using the structure shown in FIG. 1.

The structure in which each pixel P is divided as shown in FIG. 1 realizes four-level grayscale display by an area grayscale method as shown in FIG. 3. Specifically, in the case where as shown in the leftmost portion of FIG. 3, the three sub pixels Sp are all put into a black display state, black display is provided by the pixel P as a whole. In the case where as shown in the second-from-the-left portion of FIG. 3, two sub pixels Sp are put into a black display state and one sub pixel Sp is put into a white display state, a dark grayscale display is provided by the pixel P as a whole. In the case where as shown in the third-from-the-left portion of FIG. 3, two sub pixels Sp are put into a white display state and one sub pixel Sp is put into a black display state, a light grayscale display is provided by the pixel P as a whole. In the case where as shown in the rightmost portion of FIG. 3, the three sub pixels Sp are all put into a white display state, white display is provided by the pixel P as a whole.

Each of the three sub pixel electrodes 11a may be electrically connected to a different memory circuit (that is, three memory circuits may be provided for each pixel P).

As described above, in the liquid crystal display device 100 in this embodiment, the first reflective electrode 12 includes the first region 12a located in each pixel P and also includes the second region 12b located between two adjacent pixels P. This structure allows the region between the pixels P, as well as the pixels P, to contribute to reflective display. Therefore, the reflective numerical aperture (the ratio of the region contributing to the display in the reflective mode with respect to the display region) is improved, and thus the reflectance is improved. As a result, the display in the reflective mode is made brighter. In a conventional general reflective liquid crystal display device, the pixel electrode is a reflective electrode (the reflective electrode acts as a pixel electrode). Therefore, the reflective electrode is not allowed to be located between the pixels.

The liquid crystal display device 100 in this embodiment may solve the following problems of the conventional transflective liquid crystal display device.

For a transflective liquid crystal display device, a structure in which a region between adjacent pixels is used for display in a transmissive mode is known. However, no pixel electrode is located between the pixels, and therefore, liquid crystal molecules located between the pixels are not sufficiently aligned in a desired direction. This causes a problem that the transmittance is low. In addition, the region between the pixels includes a region where the alignment caused by an oblique electric field generated in the vicinity of the edge, and the alignment caused by rubbing, do not match each other well. In such a region, the alignment of the liquid crystal molecules is unstable. Such a region with such unstable alignment between the pixels is used for the display in the transmissive mode. As a result, display faults (afterimage, etc.) occur due to the faulty alignment in the display in the transmissive mode.

By contrast, in the liquid crystal display device 100 in this embodiment, the pixel electrode 11 is located in the transmissive region Tr. Therefore, the liquid crystal molecules in the transmissive region Tr are sufficiently aligned in a desired direction. This improves the transmittance. In addition, the region with stable alignment is used for the display in the transmissive mode. This alleviates the problem that the display faults occur due to the faulty alignment in the display in the transmissive mode.

Figure 4A:
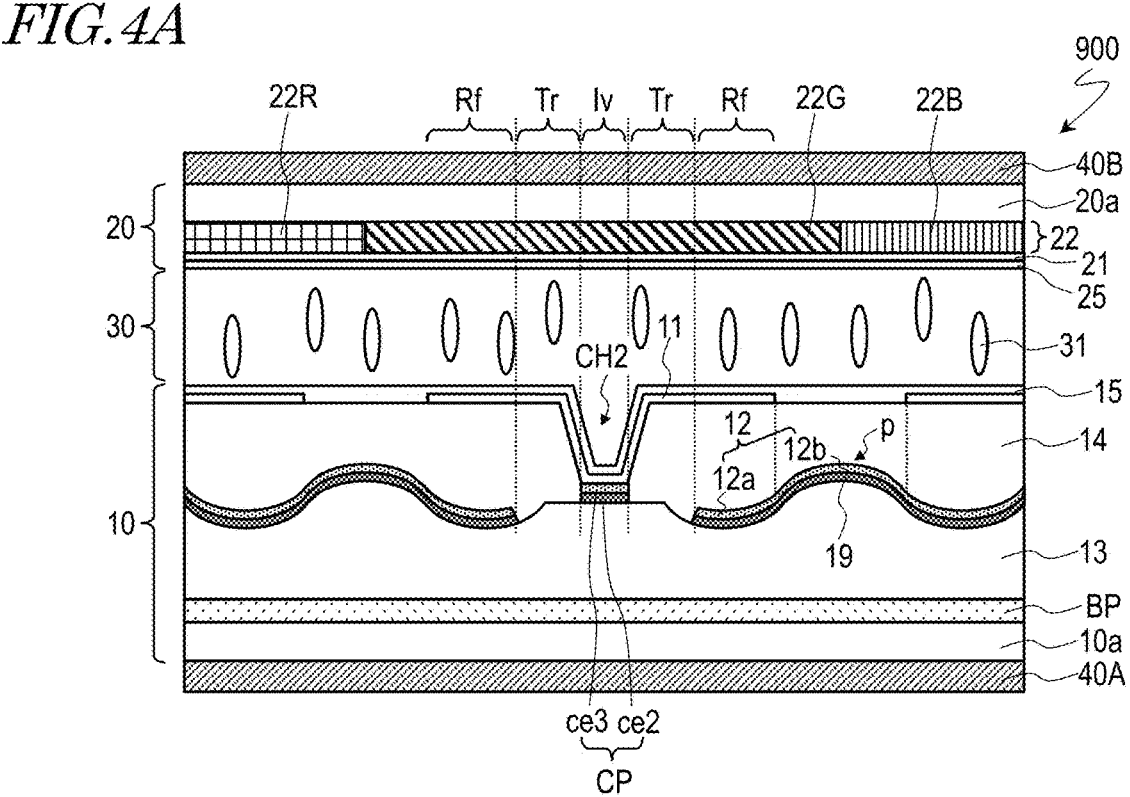
FIG. 4A is a cross-sectional view schematically showing a liquid crystal display device 900 in a comparative example.
Figure 4B:
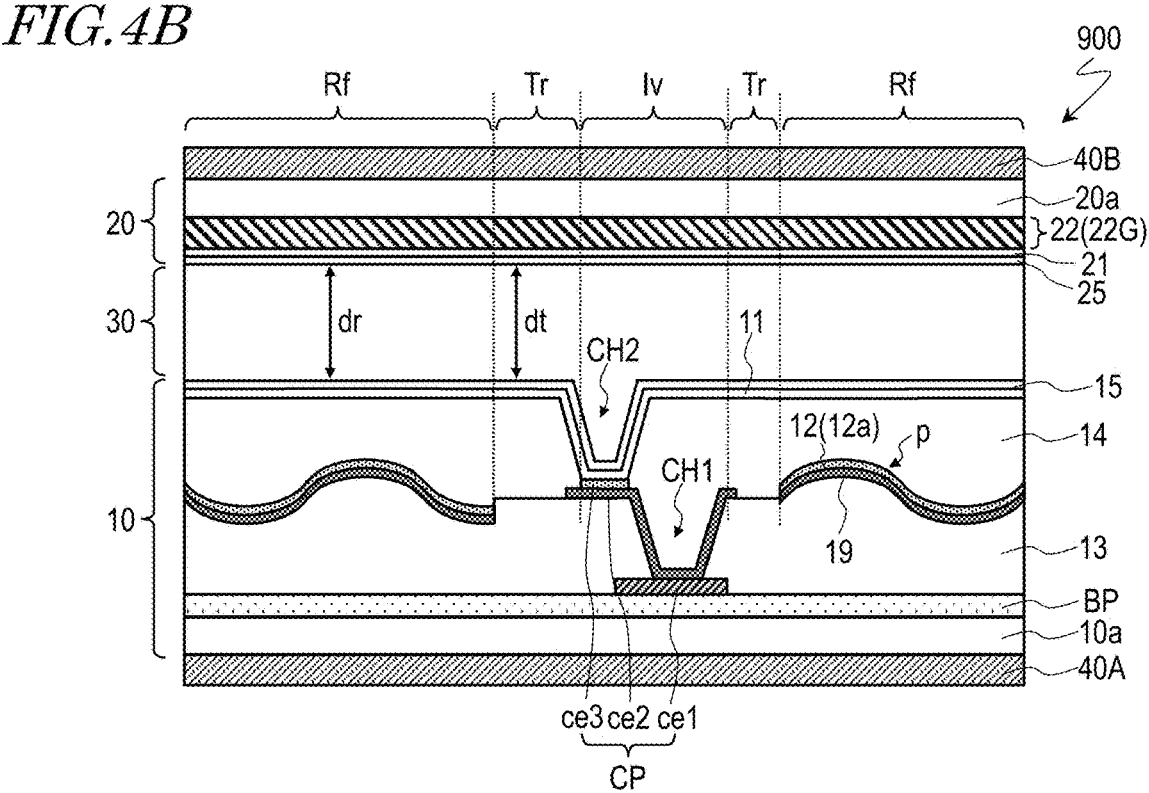
FIG. 4B is a cross-sectional view schematically showing the liquid crystal display device 900 in the comparative example.

In addition, in the liquid crystal display device 100 in this embodiment, the second reflective electrode 16 having the concaved and convexed surface structure is provided on the second interlayer insulating layer 14 so as to overlap the first contact hole CH1 as seen in the direction normal to the display surface. This allows the region where the first contact hole CH1 is located to fully contribute to the reflective display (that is, allows the region to act as the reflective region Rf). Therefore, brighter display is realized. Hereinafter, this will be described by way of a comparison between the liquid crystal display device 100 and a liquid crystal display device 900 in a comparative example shown in FIG. 4A and FIG. 4B. FIG. 4A and FIG. 4B are cross-sectional views schematically showing the liquid crystal display device 900 in the comparative example, and respectively show cross-structural structures corresponding to the cross-structural structures of the liquid crystal display device 100 shown in FIG. 2A and FIG. 2B.

As shown in FIG. 4B, the liquid crystal display device 900 in the comparative example does not include the second reflective electrode 16, unlike the liquid crystal display device 100. In the liquid crystal display device 900 in the comparative example, neither the pixel electrode 11 nor the second interlayer insulating layer 14 has a concaved and convexed surface structure in a portion overlapping the first contact hole CH1.

In the liquid crystal display device 900 in the comparative example, the region where the first contact hole CH1 is located is shielded by the first contact electrode ce1 against light from the illumination device. Therefore, the region where the first contact hole CH1 is located does not contribute to transmissive display. In addition, the region where the first contact hole CH1 is located does not include any reflective electrode, and therefore, does not contribute to reflective display, either. The region where the second contact hole CH2 is located is shielded by the third contact electrode ce3 against light from the illumination device. Therefore, the region where the second contact hole CH2 is located does not contribute to the transmissive display. The third contact electrode ce3 located in the region where the second contact hole CH2 is located is formed of the metal film also used to form the first reflective electrode 12. However, the second contact hole CH2 has a tapering shape steeper than that of the concaved and convexed surface structure of the first reflective electrode 12. Therefore, the third contact electrode ce3 does not contribute to diffused reflection, and the region where the second contact hole CH2 is located does not contribute to the reflective display, either. As can be seen, in the liquid crystal display device 900 in the comparative example, the region where the first contact hole CH1 is located and the region where the second contact hole CH2 is located are invalid regions Iv.

By contrast, in the liquid crystal display device 100 in this embodiment, the second reflective electrode 16 having the concaved and convexed surface structure is provided on the second interlayer insulating layer 14 so as to overlap the first contact hole CH1. This allows the region where the first contact hole CH1 is located to fully contribute to the reflective display. Therefore, the area size of the invalid region Iv is smaller than, and thus the display is brighter than, in the liquid crystal display device 900 in the comparative example.

For the liquid crystal display device 100, it is preferred that any of the following driving methods is used.

Method (A): Regions of the liquid crystal layer 30 corresponding to any two pixels P, among the plurality of pixels P, adjacent to each other in the row direction are supplied with voltages of the same polarity. This method is referred to as "row line inversion driving (H line inversion driving)", and encompasses a form in which the polarity of the voltage is inverted every certain number of rows (2H line inversion driving, etc.) (the certain number of rows being a plurality of rows)

Method (B): Regions of the liquid crystal layer 30 corresponding to any two pixels P, among the plurality of pixels P, adjacent to each other in the column direction are supplied with voltages of the same polarity. This method is referred to as "column line inversion driving (V line inversion driving)", and encompasses a form in which the polarity of the voltage is inverted every certain number of columns (2V line inversion driving, etc.) (the certain number of columns being a plurality of columns).

Method (C): Regions of the liquid crystal layer 30 corresponding to all the plurality of pixels P are supplied with voltages of the same polarity. This method is referred to as "field inversion driving (frame inversion driving)".

Driving the liquid crystal display device 100 by any of methods (A), (B) and (C) enhances the effect of improving the reflectance (the effect of making the display brighter). Hereinafter, a reason for this will be described.

As a driving method of a liquid crystal display device, a method referred to as "dot inversion driving" is well known and widely used. According to the dot inversion driving, regions of the liquid crystal layer corresponding to any two pixels, among the plurality of pixels, adjacent to each other is supplied with voltages of different polarities. That is, the polarity of the applied voltage is inverted pixel by pixel in the row direction, and pixel by pixel also in the column direction. In the case where the polarity of the voltage applied to a region of the liquid crystal layer corresponding to one pixel is opposite to the polarity of the voltage applied to a region of the liquid crystal layer corresponding to a pixel adjacent thereto, like in the case of the dot inversion driving, the liquid crystal molecules located between the pixels may possibly not be aligned so as to contribute to brightness due to the influence of the oblique electric field generated between the pixels.

By contrast, in the case of any of methods (A), (B) and (C), the voltages applied to the regions of the liquid crystal layer corresponding to adjacent pixels P are of the same polarity (the polarity is not inverted) in at least one of the row direction and the column direction. Therefore, the liquid crystal molecules 31 located between the pixels P supplied with the voltages of the same polarity are allowed to be aligned so as to contribute to brightness. This enhances the effect of improving the reflectance. From the point of view of further improving the reflectance, method (C) is more preferred to method (A) or (B). That is, field inversion driving, by which regions of the liquid crystal layer 30 corresponding to all the plurality of pixels P are supplied with voltages of the same polarity, is preferred.

[Results of investigation on the effect of improving the brightness]

The liquid crystal display device 100 in this embodiment was produced (example 1), and the effect of improving the brightness was investigated. The results will be described. The produced liquid crystal display device 100 had a screen size of 1.2 inches, and the pixels P each had a size of 126 μm (length)×42 μm (width). Among the first alignment film 15 of the TFT substrate 10 and the second alignment film 25 of the counter substrate 20, only the second alignment film 25 was treated by rubbing. Therefore, among the first alignment film 15 and the second alignment film 25, only the second alignment film 25 defined the pretilt direction. The thickness (cell gap) of the liquid crystal layer 30 was 3 μm. The liquid crystal material forming the liquid crystal layer 30 had a chiral agent incorporated thereto such that the twist angle would be 70 degrees in the presence of a white voltage. The driving method was field inversion driving (method (C)).

The liquid crystal display device 900 in the comparative example was produced in substantially the same manner as in example 1, and compared against example 1. Regarding example 1 and the comparative example, Table 1 shows the ratio of the transmissive region Tr with respect to the display region (transmissive numerical aperture), the ratio of the reflective region Rf with respect to the display region (reflective numerical aperture), the reflectance in white display (white reflectance), the reflectance in black display (black reflectance), and the contrast ratio.

TABLE 1

| | TRANSMISSIVE NUMERICAL APERTURE | REFLECTIVE NUMERICAL APERTURE | WHITE REFLECTANCE | BLACK REFLECTANCE | CONTRAST RATIO |
|---|---|---|---|---|---|
| EX. 1 | 11.6% | 84.2% | 9.27% | 0.38% | 24.4 |
| COMPARATIVE EXAMPLE | 11.6% | 79.9% | 8.8% | 0.37% | 23.8 |

As shown in Table 1, the transmissive numerical aperture is the same in example 1 and in the comparative example. By contrast, the reflective numerical aperture is about 1.05 times higher in example 1 than in the comparative example. Therefore, the white reflectance is about 1.05 times higher in example 1 than in the comparative example. The black reflectance is also higher in example 1 than in the comparative example because the reflective numerical aperture is higher in example 1. However, the reflectance at the outermost surface of the liquid crystal display device is the same in example 1 and in the comparative example. Therefore, the black reflectance is merely about 1.03 times higher in example 1 than in the comparative example. As a result of the above, the contrast ratio is about 1.02 times higher in example 1 than in the comparative example.

As can be seen, the liquid crystal display device 100 in this embodiment of the present invention has been confirmed to improve the brightness of the display.

In the liquid crystal display device 100 in this embodiment, the region between the pixels P contributes to the display in the reflective mode. Therefore, it is preferred that the counter substrate 20 does not includes the black matrix between any two pixels P adjacent to each other among the plurality of pixels P. For the same reason, it is preferred that the red color filter 22R, the green color filter 22G and the blue color filter 22B do not overlap each other as seen in the direction normal to the display surface.

[Potential of the first reflective electrode]

There is no specific limitation on the potential to be supplied to the first reflective electrode 12. For example, the first reflective electrode 12 may be supplied with a potential equal to the potential supplied to the counter electrode 21. Alternatively, the first reflective electrode 12 may be supplied with a potential different from the potential supplied to the counter electrode 21. For example, the first reflective electrode 12 may be supplied with a potential equal to the potential supplied to the pixel electrode 11 at the time of display of the highest grayscale level (hereinafter, such a potential will be referred to as a "white display potential"). In the case where the first reflective electrode 12 is supplied with a potential different from the potential supplied to the counter electrode 21, the region of the liquid crystal layer 30 corresponding to the region between the pixels P is supplied with a sufficiently high voltage. Therefore, the region between the pixels P is made brighter in white display. This further enhances the effect of improving the reflectance.

The first reflective electrode 12 may be in an electrically floating state, or may be supplied with a ground potential. In the case where the first reflective electrode 12 is put into a floating state or supplied with a ground potential, the average of the time period in which the voltage is applied to the region between the first reflective electrode 12 and the pixel electrode 11 is made equal in a white display state and in a black display state. This suppresses screen burn-in, and therefore, allows low-frequency driving to be performed in a preferred manner.

Table 2 shows examples of the potential to be supplied to the pixel electrode 11, the first reflective electrode 12, the second reflective electrode 16, and the counter electrode 21.

TABLE 2

| | WHITE DISPLAY | | BLACK DISPLAY | | |
|---|---|---|---|---|---|
| | POSITIVE | NEGATIVE | POSITIVE | NEGATIVE | REMARKS |
| COUNTER ELECTRODE | 0 V | 3 V | 0 V | 3 V | |
| PIXEL ELECTRODE/ 2ND REFLECTIVE ELECTRODE | 3 V | 0 V | 0 V | 3 V | |
| 1ST REFLECTIVE ELECTRODE | 0 V | 3 V | 0 V | 3 V | POTENTIAL EQUAL TO POTENTIAL OF COUNTER ELECTRODE |
| | 3 V | 0 V | 3 V | 0 V | POTENTIAL EQUAL TO WHITE DISPLAY POTENTIAL |
| | FLOATING | | FLOATING | | FLOATING |
| | 0 V | | 0 V | | GROUND POTENTIAL |

[Other forms]

In the above example, the backplane circuit BP including a memory circuit for each of the pixels P is described. The backplane circuit BP is not limited to this type. The backplane circuit BP may include TFTs connected with the pixel electrodes 11, and gate bus lines, source bus lines and the like connected with the TFTs, like in a general active matrix substrate. Such TFTs each include, for example, an amorphous silicon layer, a polycrystalline silicon layer, or an oxide semiconductor layer containing an In—Ga—Zn—O-based semiconductor as an active layer (see Japanese Laid-Open Patent Publication No. 2014-007399). Japanese Laid-Open Patent Publication No. 2014-007399 is hereby incorporated by reference.

In the above example, a VA-HAN mode, by which one of the vertical alignment films defines the pretilt direction, is described. Alternatively, a VA-TN mode, by which both of the vertical alignment films define the pretilt direction, may be used.

In the above example, a structure in which the cell gap dt of the transmissive region Tr and the cell gap dr of the reflective region Rf are equal to each other is described. Alternatively, a structure in which the cell gap dt of the transmissive region Tr is larger than the cell gap dr of the reflective region Rf (i.e., dt>dr) may be used.

Light used to provide the display in the transmissive mode passes the liquid crystal layer 30 once, whereas light used to provide the display in the reflective mode passes the liquid crystal layer 30 twice. Therefore, in the case where the cell gap dt of the transmissive region Tr is larger than the cell gap dr of the reflective region Rf, the retardation of the liquid crystal layer 30 to the light used to provide the display in the transmissive mode is made closer to the retardation of the liquid crystal layer 30 to the light used to provide the display in the reflective mode. This realizes a voltage-brightness curve that is preferred to both of the transmissive region Tr and the reflective region Rf (that provides brighter display).

From the point of view of providing brighter display by both of the transmissive region Tr and the reflective region Rf, it is preferred that the cell gap dt of the transmissive region Tr and the cell gap dr of the reflective region Rf substantially satisfy the relationship of dt=2dr.

In the above example, the pixels P are each divided into a plurality of sub pixels Sp. The pixels P do not need to be divided into a plurality of sub pixels Sp.

Embodiment 2

Figure 5:
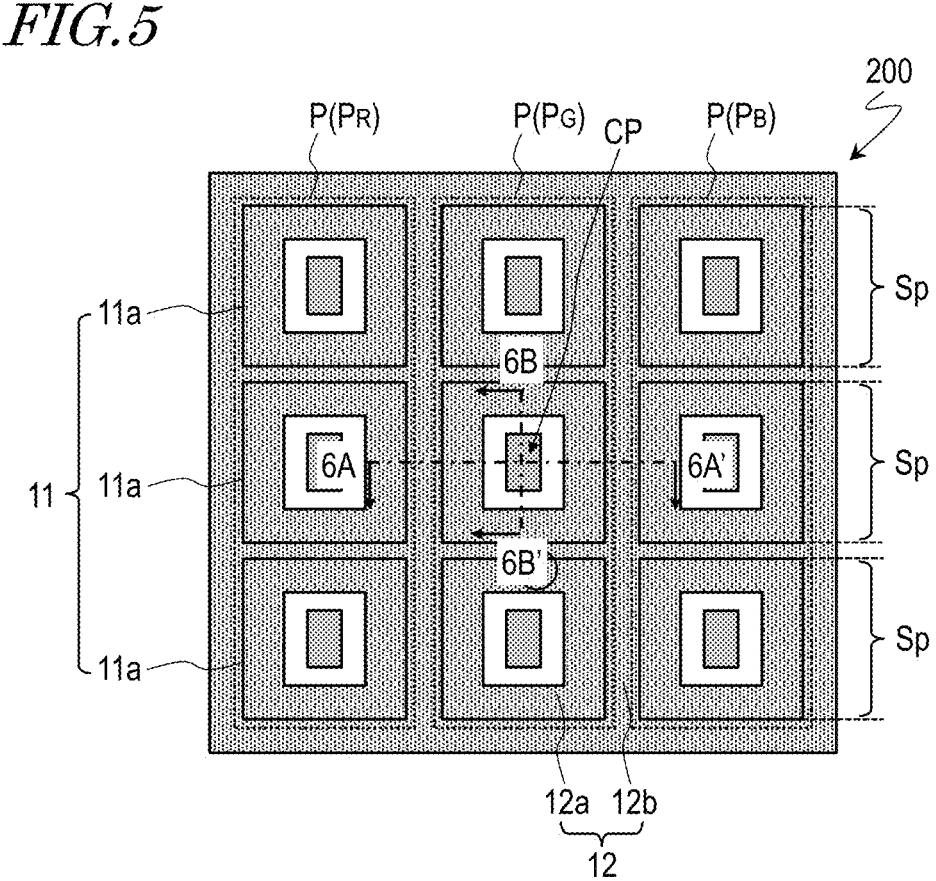
FIG. 5 is a plan view schematically showing another liquid crystal display device 200 according to an embodiment of the present invention, and shows a region corresponding to three pixels P of the liquid crystal display device 200.
Figure 6A:
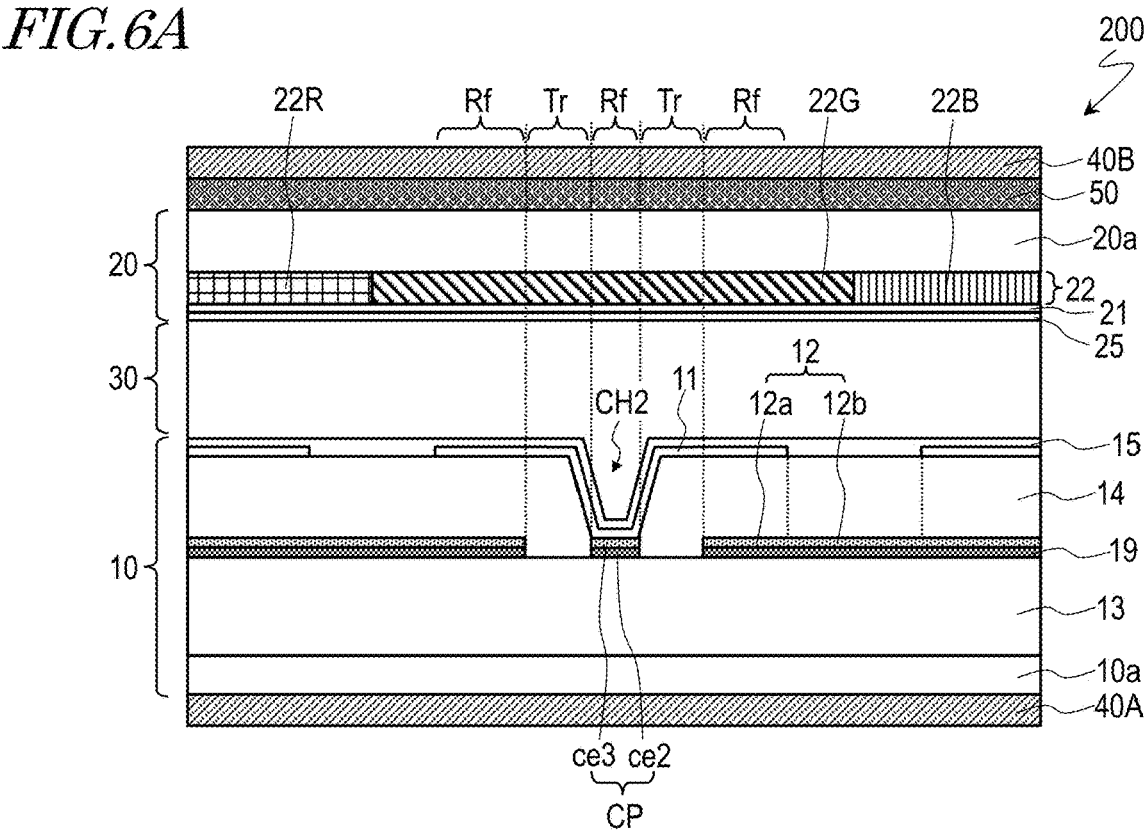
FIG. 6A is a cross-sectional view schematically showing the liquid crystal display device 200, and shows a cross-sectional structure taken along line 6A-6A' in FIG. 5.
Figure 6B:
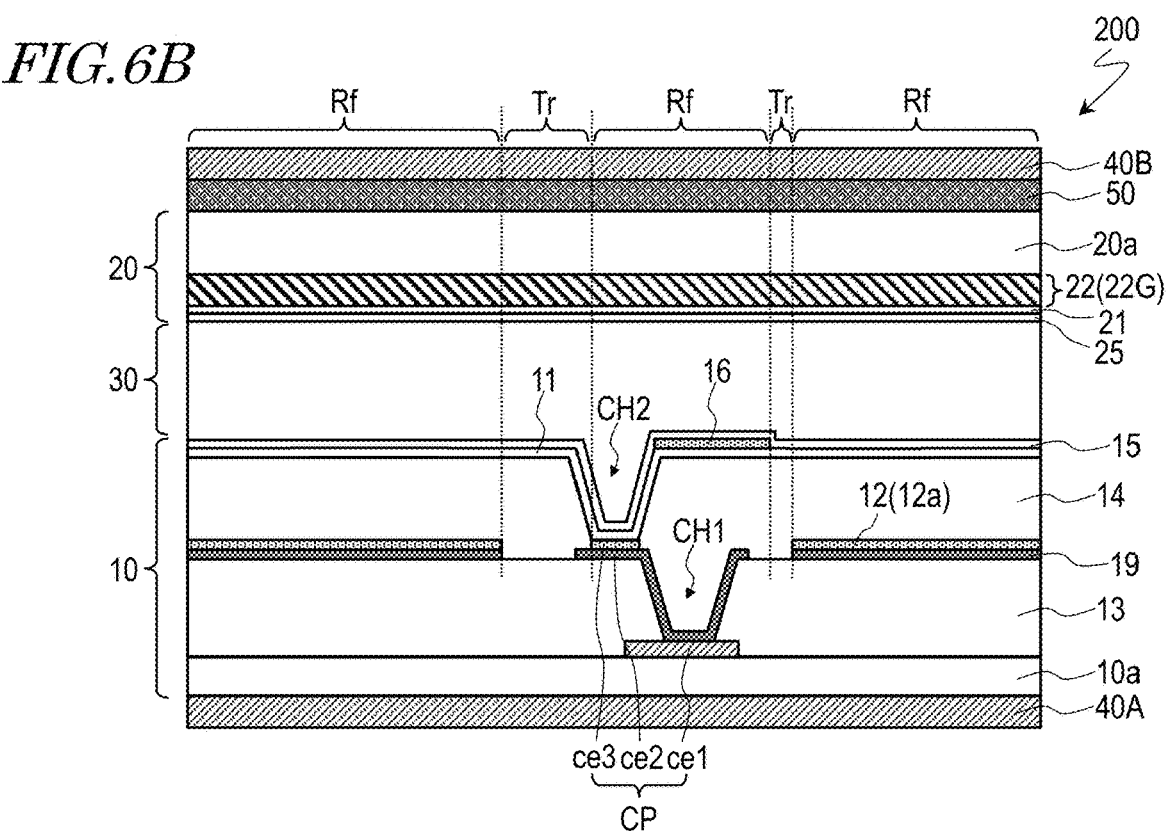
FIG. 6B is a cross-sectional view schematically showing the liquid crystal display device 200, and shows a cross-sectional structure taken along line 6B-6B' in FIG. 5.

With reference to FIG. 5, FIG. 6A and FIG. 6B, a liquid crystal display device 200 in this embodiment will be described. FIG. 5 is a plan view schematically showing the liquid crystal display device 200, and shows a region corresponding to three pixels P of the liquid crystal display device 200. FIG. 6A and FIG. 6B are cross-sectional views schematically showing the liquid crystal display device 200, and respectively show cross-sectional structures taken along line 6A-6A' and line 6B-6B' in FIG. 5. Hereinafter, differences of the liquid crystal display device 200 in this embodiment from the liquid crystal display device 100 in embodiment 1 will be mainly described.

In the liquid crystal display device 200, the first reflective electrode 12 and the second reflective electrode 16 are respectively formed on the first interlayer insulating layer 13 and the second interlayer insulating layer 14 that do not have the concaved and convexed shape (namely, that are flat). Therefore, neither the first reflective electrode 12 nor the second reflective electrode 16 has a concaved and convexed surface structure, and the first reflective electrode 12 and the second reflective electrode 16 each act as a mirror reflective layer.

The liquid crystal display device 200 further includes a light scattering layer 50 located on a viewer side with respect to the liquid crystal layer 30. The light scattering layer 50 is, for example, an anisotropic light scattering film. In the example shown in FIG. 6A and FIG. 6B, the light scattering layer 50 is located between the substrate 20a and the second circularly polarized plate 40B. In this embodiment, the light scattering layer 50 scatters light, and as a result, display close to paper white is realized.

In the liquid crystal display device 200 in this embodiment, a combination of the second reflective electrode 16 and the light scattering layer 50 allows the region where the first contact hole CH1 is located to fully contribute to reflective display. This realizes brighter display.

In the liquid crystal display device 200 in this embodiment, a combination of the third contact electrode ce3, provided on the first interlayer insulating layer 13 so as to overlap the second contact hole CH2 as seen in a direction normal to a display surface of the liquid crystal display device 200, and the light scattering layer 50 allows the region where the second contact hole CH2 is located to fully contribute to the reflective display. Therefore, the region contributing to the reflective display is made larger (for example, the invalid region Iv is substantially eliminated). In this case, the third contact electrode ce3 acts as a third reflective electrode for the reflective display. The third contact electrode (third reflective electrode) ce3 does not have a concaved and convexed surface structure, either.

In the above, the transflective (transmissive and reflective) liquid crystal display device is described. The liquid crystal display device according to an embodiment of the present invention may be a reflective liquid crystal display device, in which each of the pixels P substantially includes no transmissive region Tr. Even such a reflective liquid crystal display device improves the brightness of the display by including another reflective electrode substantially the same as the second reflective electrode 16 of the liquid crystal display device 100 or 200 described above.

Embodiment 3

Figure 7:
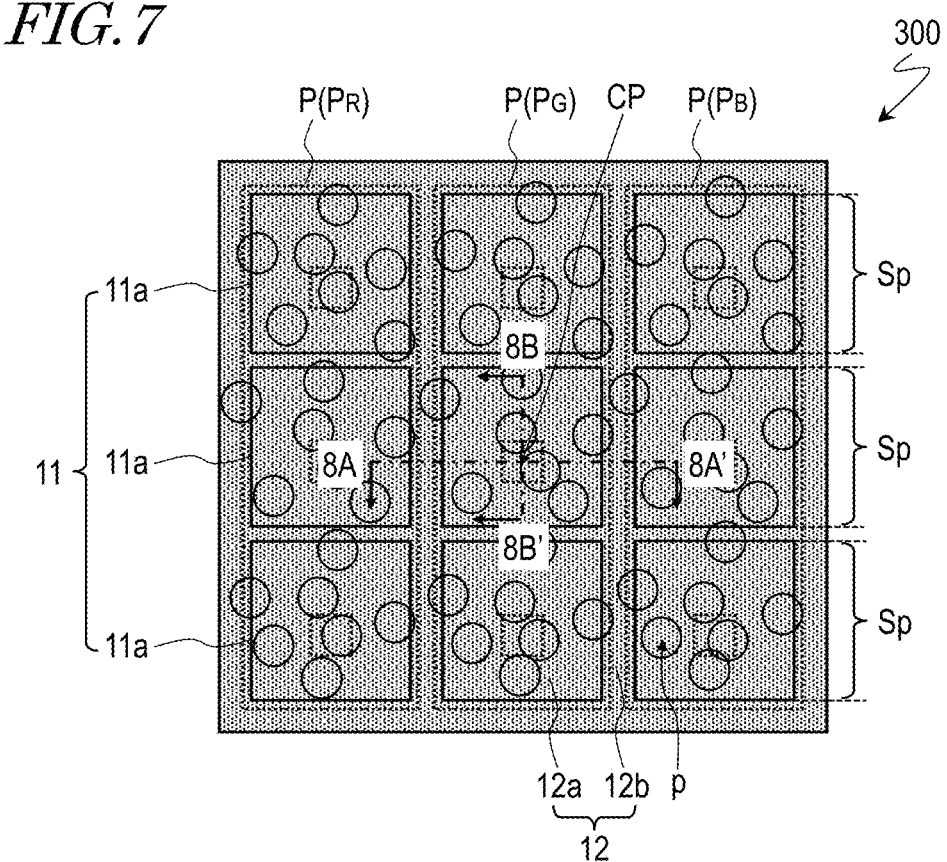
FIG. 7 is a plan view schematically showing still another liquid crystal display device 300 according to an embodiment of the present invention, and shows a region corresponding to three pixels P of the liquid crystal display device 300.
Figure 8A:
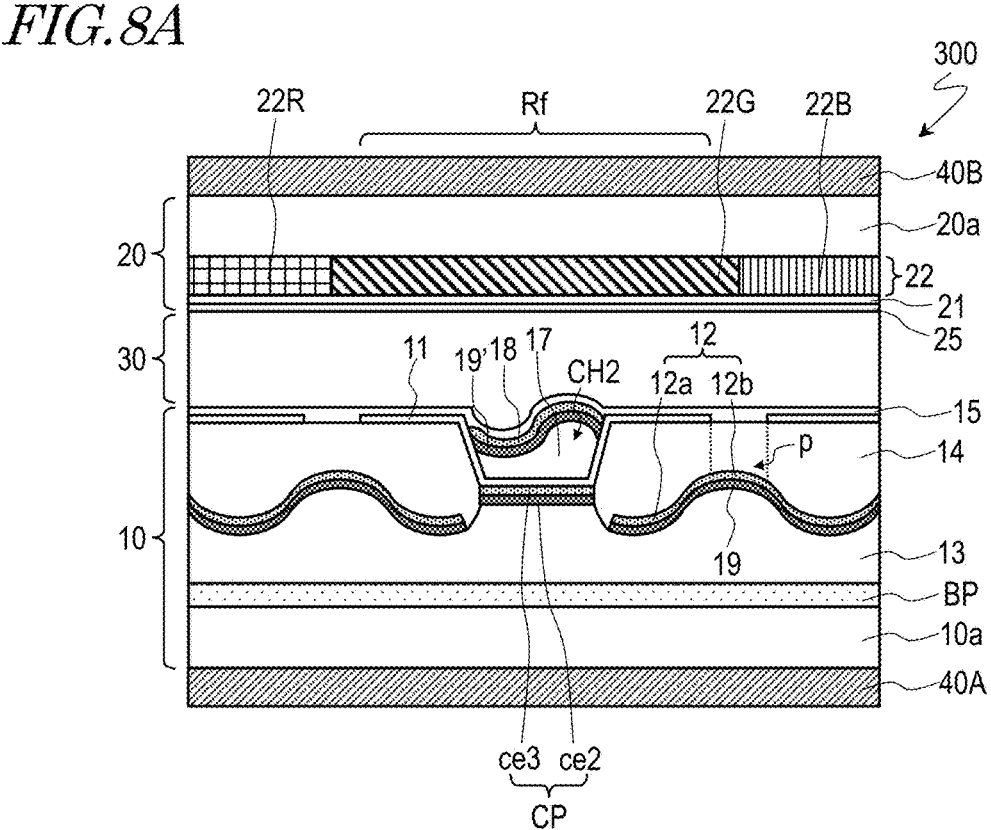
FIG. 8A is a cross-sectional view schematically showing the liquid crystal display device 300, and shows a cross-sectional structure taken along line 8A-8A' in FIG. 7.
Figure 8B:
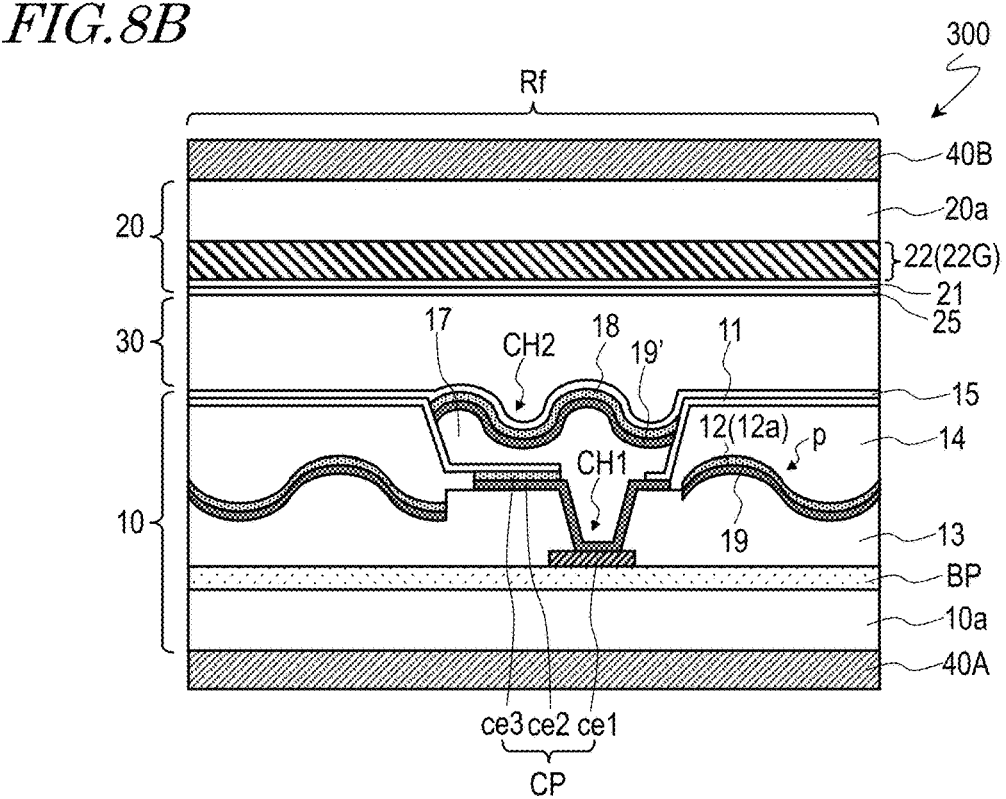
FIG. 8B is a cross-sectional view schematically showing the liquid crystal display device 300, and shows a cross-sectional structure taken along line 8B-8B' in FIG. 7.

With reference to FIG. 7, FIG. 8A and FIG. 8B, a liquid crystal display device 300 in this embodiment will be described. The liquid crystal display device 300 in this embodiment is a reflective liquid crystal display device. FIG. 7 is a plan view schematically showing the liquid crystal display device 300, and shows a region corresponding to three pixels P of the liquid crystal display device 300. FIG. 8A and FIG. 8B are cross-sectional views schematically showing the liquid crystal display device 300, and respectively show cross-sectional structures taken along line 8A-8A' and line 8B-8B' in FIG. 7.

As shown in FIG. 7, the liquid crystal display device 300 includes a plurality of pixels P. The plurality of pixels P are arranged in a matrix including a plurality of rows and a plurality of columns. The plurality of pixels P typically include red pixels $P_R$ displaying red, green pixels $P_G$ displaying green, and blue pixels $P_B$ displaying blue.

As shown in FIG. 8A and FIG. 8B, the liquid crystal display device 300 includes a TFT substrate (first substrate) 10, a counter substrate (second substrate) 20 facing the TFT substrate 10, and a vertical alignment-type liquid crystal layer 30 provided between the TFT substrate 10 and the counter substrate 20. The pixels P each include a reflective region Rf providing display in a reflective mode.

The TFT substrate 10 includes a substrate 10a, a backplane circuit BP, a first interlayer insulating layer 13, a first reflective electrode 12, a second interlayer insulating layer 14, and a pixel electrode 11.

The substrate 10a supports the backplane circuit BP and the like. The substrate plate 10a is transparent and insulating. The substrate 10a is, for example, a glass substrate or a plastic substrate.

The backplane circuit BP is provided on the substrate 10a. The backplane circuit BP is a circuit that drives the plurality of pixels P. In this example, the backplane circuit BP includes a memory circuit connected with each of the plurality of pixels P.

The first interlayer insulating layer 13 is provided so as to cover the backplane circuit BP. The first interlayer insulating layer 13 has a surface having a concaved and convexed shape. That is, the first interlayer insulating layer 13 has a concaved and convexed surface structure.

The first reflective electrode 12 is provided on the first interlayer insulating layer 13. The first reflective electrode 12 is formed of a metal material having a high reflectance. In this example, a silver alloy is used as the metal material forming the first reflective electrode 12. The first reflective electrode 12 is not limited to being formed of a silver alloy, and may be formed of, for example, aluminum or an aluminum alloy. The first reflective electrode 12 has a surface having a concaved and convexed shape that reflects the concaved and convexed surface structure of the first interlayer insulating layer 13. That is, the first reflective electrode 12 also has a concaved and convexed surface structure.

The first reflective electrode 12 includes a first region 12a located in each of the plurality of pixels P and a second region 12b located between any two pixels P adjacent to each other. The concaved and convexed surface structure of the first reflective electrode 12 is formed in each of the first region 12a and the second region 12b. That is, the first region 12a and the second region 12b both have the concaved and convexed surface structure.

The second interlayer insulating layer 14 is provided so as to cover the second reflective electrode 12. The second interlayer insulating layer 14 is transparent and insulating.

The pixel electrode 11 is provided in each of the plurality of pixels P. The pixel electrode 11 is provided on the second interlayer insulating layer 14. That is, the pixel electrode 11 is located on the first reflective electrode 12, with the second interlayer insulating layer 14 (transparent insulating layer) being located between the pixel electrode 11 and the first reflective electrode 12. In other words, the first reflective electrode 12 is located on the side opposite to the liquid crystal layer 30, with the pixel electrode 11 being located between the first reflective electrode 12 and the liquid crystal layer 30 (that is, the first reflective electrode 12 is located closer to a rear surface of the liquid crystal display device 300 than the pixel electrode 11).

The pixel electrode 11 is formed of a transparent conductive material. The transparent conductive material may be, for example, indium tin oxide, indium zinc oxide, or a mixture thereof. The pixel electrode 11 is electrically connected with the backplane circuit BP including the memory circuits.

The TFT substrate 10 further includes a contact portion CP, a third interlayer insulating layer 17, a second reflective electrode 18, and a first alignment film 15.

The contact portion CP electrically connects the pixel electrode 11 and the backplane circuit BP to each other in a first contact hole CH1 formed in the first interlayer insulating layer 13 and a second contact hole CH2 formed in the second interlayer insulating layer 14. In the example shown in FIG. 8B, the contact portion CP includes a first contact electrode ce1, a second contact electrode ce2 and a third contact electrode ce3.

The first contact electrode ce1 is an electrode (or a portion of a wire) exposed to an inner space of the first contact hole CH1. The second contact electrode ce2 is formed on the first interlayer insulating layer 13 and in the first contact hole CH1, and is connected with the first contact electrode ce1 in the first contact hole CH1. A portion of the second contact electrode ce2 is exposed to an inner space of the second contact hole CH2. The third contact electrode ce3 is connected with the second contact electrode ce2 and the pixel electrode 11 in the second contact hole CH2. In other words, the third contact electrode ce3 is located between the second contact electrode ce2 and the pixel electrode 11. In this example, the first contact electrode ce1 is formed of a metal material and is non-transparent. The second contact electrode ce2 is formed of a transparent conductive material (namely, is transparent). The third contact electrode ce3 is formed of a metal film that is also used to form the first reflective electrode 12 (that is, formed in the same layer as the first reflective electrode 12), and is non-transparent. In the example shown in FIG. 8A and FIG. 8B, a conductive layer 19 formed of a transparent conductive film also used to form the second contact electrode ce2 (that is, formed in the same layer as the second contact electrode ce2) is located between the first reflective electrode 12 and the first interlayer insulating layer 13. The conductive layer 19 may be omitted.

The third interlayer insulating layer 17 is provided in the second contact hole CH2. In the example shown in FIG. 8A and FIG. 8B, the second contact hole CH2 and the third interlayer insulating layer 17 overlap the first contact hole CH2 as seen in a direction normal to a display surface of the liquid crystal display device 300. Therefore, the third interlayer insulating layer 17 is also located in the first contact hole CH1.

The second reflective electrode 18 is located on the third interlayer insulating layer 17. The second reflective electrode 18 is located so as to overlap at least the second contact hole CH2 as seen in the direction normal to the display surface. In the example shown in FIG. 8A and FIG. 8B, the second reflective electrode 18 overlaps the first contact hole CH1 as well as the second contact hole CH2. The second reflective electrode 18 contacts the pixel electrode 11, and is electrically connected with the pixel electrode 11. In the example shown in FIG. 8A and FIG. 8B, a conductive layer 19' formed of a transparent conductive material is provided between the second reflective electrode 18 and the third interlayer insulating layer 17. The conductive layer 19' may be omitted. In the case where the conductive layer 19' is provided, the second reflective electrode 18 may be electrically connected with the pixel electrode 11, with the conductive layer 19' being located between the second reflective electrode 18 and the pixel electrode 11.

The second reflective electrode 18 is formed of a metal material having a high reflectance. In this example, a silver alloy is used as the metal material forming the second reflective electrode 18. The second reflective electrode 18 is not limited to being formed of a silver alloy, and may be formed of, for example, aluminum or an aluminum alloy.

The third interlayer insulating layer 17 has a concaved and convexed surface structure. The third interlayer insulating layer 17 having the concaved and convexed surface structure may be formed of a photosensitive resin, like the first interlayer insulating layer 13.

The second reflective electrode 18 has a concaved and convexed shape that reflects the concaved and convexed surface structure of the third interlayer insulating layer 17. That is, the second reflective electrode 18 also has a concaved and convexed surface structure.

The counter substrate 20 includes a substrate 20a, a color filter layer 22, a counter electrode (common electrode) 21, and a second alignment film 25. Although not shown, the counter substrate 20 further includes a plurality of column-like spacers.

The substrate 20a supports the color filter layer 22 and the like. The substrate 20a is transparent and insulating. The substrate 20a is, for example, a glass substrate or a plastic substrate.

The color filter layer 22 typically includes a red color filter 22R provided in a region corresponding to the red pixel $P_R$, a green color filter 22G provided in a region corresponding to the green pixel $P_G$, and a blue color filter 22B provided in a region corresponding to the blue pixel $P_B$. The red color filter 22R, the green color filter 22G and the blue color filter 22B respectively transmit red light, green light and blue light. The counter substrate 20 does not include a black matrix (light-blocking layer) between any two pixels P adjacent to each other.

The counter electrode 21 is provided so as to face the pixel electrode 11 and the like. The counter electrode 21 is formed of a transparent conductive material. The material used to form the counter electrode 21 may be substantially the same as any of the materials usable to form the pixel electrode 11.

The column-like spacers define the thickness (cell gap) of the liquid crystal layer 30. The column-like spacers may be formed of a photosensitive resin.

The liquid crystal layer 30 contains a nematic liquid crystal material having negative dielectric anisotropy and a chiral agent. The liquid crystal layer 30 may be formed by, for example, a dripping method.

The first alignment film 15 and the second alignment film 25 are each provided so as to contact the liquid crystal layer 30. In this example, the first alignment film 15 and the second alignment film 25 are each a vertical alignment film. At least one of the first alignment film 15 and the second alignment film 25 is alignment-treated and defines a pretilt direction. Liquid crystal molecules 31 in the liquid crystal layer 30 are vertically aligned in a state where no voltage is applied to the liquid crystal layer 30, and fall to be twisted-aligned when a predetermined voltage is applied to the liquid crystal layer 30. As can be seen, the liquid crystal layer 30 is a vertical alignment-type liquid crystal layer.

The liquid crystal display device 300 further includes a pair of circularly polarized plates 40A and 40B and an illumination device (backlight unit) not shown. One of the pair of circularly polarized plates 40A and 40B, specifically, a first circularly polarized plate 40A, is located on a rear surface side of the TFT substrate 10. The other circularly polarized plate, specifically, a second circularly polarized plate 40B, is located on a viewer side of the counter substrate 20. The illumination device is located on a rear surface side of the first circularly polarized plate 40A.

The liquid crystal display device 300 described in this example has a structure that provides grayscale display as a memory liquid crystal display device. Specifically, as shown in FIG. 7, the pixels P of the liquid crystal display device 300 are each divided into a plurality of sub pixels Sp, and the pixel electrodes 11 are each divided into a plurality of sub pixel electrodes 11a. The liquid crystal display device 300 realizes grayscale display by an area grayscale method, like the liquid crystal display device 100 in embodiment 1.

As described above, in the liquid crystal display device 300 in this embodiment, the first reflective electrode 12 includes the first region 12a located in the pixel P and also includes the second region 12b located between two adjacent pixels P. This structure allows the region between the pixels P, as well as the pixels P, to contribute to reflective display. Therefore, the reflective numerical aperture (the ratio of the region contributing to the display in the reflective mode with respect to the display region) is improved, and thus the reflectance is improved. As a result, the display in the reflective mode is made brighter.

In addition, in the liquid crystal display device 300 in this embodiment, the second reflective electrode 18 having the concaved and convexed surface structure is provided on the third interlayer insulating layer 17 so as to overlap the first contact hole CH1 and the second contact hole CH2 as seen in the direction normal to the display surface. This allows the regions where the first contact hole CH1 and the second contact hole CH2 are located to fully contribute to the reflective display (that is, allows the regions to act as the reflective region Rf). Therefore, still brighter display is realized. In the liquid crystal display device 100 in embodiment 1, the region where the second contact hole CH2 is located is an invalid region Iv. In the liquid crystal display device 300 in this embodiment, the region where the second contact hole CH2 is located is also allowed to act as the reflective region Rf. Therefore, the invalid region Iv in the pixel P is substantially eliminated.

For the liquid crystal display device 300 also, it is preferred to use any of driving methods (A), (B) and (C) described above. Driving the liquid crystal display device 300 by any of methods (A), (B) and (C) enhances the effect of improving the reflectance (the effect of making the display brighter).

[Results of investigation on the effect of improving the brightness]

The liquid crystal display device 300 in this embodiment was produced (example 2), and the effect of improving the brightness was investigated. The results will be described. The produced liquid crystal display device 300 had a screen size of 1.2 inches, and the pixels P each had a size of 126 μm (length)×42 μm (width). Among the first alignment film 15 of the TFT substrate 10 and the second alignment film 25 of the counter substrate 20, only the second alignment film 25 was treated by rubbing. Therefore, among the first alignment film 15 and the second alignment film 25, only the second alignment film 25 defined the pretilt direction. The thickness (cell gap) of the liquid crystal layer 30 was 3 μm. The liquid crystal material forming the liquid crystal layer 30 had a chiral agent incorporated thereto such that the twist angle would be 70 degrees in the presence of a white voltage. The driving method was field inversion driving (method (C)).

A liquid crystal display device in example 1 was modified to be a reflective type (that is, the transmissive region Tr in example 1 was replaced with a reflective region Rf), and was used as a liquid crystal display device in example 3. The liquid crystal display device in example 3 was compared against the liquid crystal display device in example 2. Regarding example 2 and example 3, Table 3 shows the transmissive numerical aperture, the reflective numerical aperture, the white reflectance, the black reflectance, and the contrast ratio.

TABLE 3

| | TRANSMISSIVE NUMERICAL APERTURE | REFLECTIVE NUMERICAL APERTURE | WHITE REFLECTANCE | BLACK REFLECTANCE | CONTRAST RATIO |
|---|---|---|---|---|---|
| EX. 2 | | 100% | 11.01% | 0.42% | 26.2 |
| EX. 3 | | 95.8% | 10.55% | 0.41% | 25.7 |

As shown in Table 3, the reflective numerical aperture is about 1.04 times higher in example 2 than in example 3. Therefore, the white reflectance is about 1.04 times higher in example 2 than in example 3. The black reflectance is also higher in example 2 than in example 3 because the reflective numerical aperture is higher in example 2. However, the reflectance at the outermost surface of the liquid crystal display device is the same in example 2 and in example 3. Therefore, the black reflectance is merely about 1.03 times higher in example 2 than in example 3. As a result of the above, the contrast ratio is about 1.02 times higher in example 2 than in example 3.

As can be seen, the structure of the liquid crystal display device 300 in this embodiment has been confirmed to improve the brightness of the display.

[Potential of the first reflective electrode]

There is no specific limitation on the potential to be supplied to the first reflective electrode 12. For example, the first reflective electrode 12 may be supplied with a potential equal to the potential supplied to the counter electrode 21. Alternatively, the first reflective electrode 12 may be supplied with a potential different from the potential supplied to the counter electrode 21. For example, the first reflective electrode 12 may be supplied with a potential equal to the white display potential. In the case where the first reflective electrode 12 is supplied with a potential different from the potential supplied to the counter electrode 21, the region of the liquid crystal layer 30 corresponding to the region between the pixels P is supplied with a sufficiently high voltage. Therefore, the region between the pixels P is made brighter in white display. This further enhances the effect of improving the reflectance.

The first reflective electrode 12 may be in a floating state, or may be supplied with a ground potential. In the case where the first reflective electrode 12 is put into a floating state or supplied with a ground potential, the average of the time period in which the voltage is applied to the region between the first reflective electrode 12 and the pixel electrode 11 is made equal in a white display state and in a black display state. This suppresses screen burn-in, and therefore, allows low-frequency driving to be performed in a preferred manner.

Table 4 shows examples of the potential to be supplied to the pixel electrode 11, the first reflective electrode 12, the second reflective electrode 18, and the counter electrode 21.

TABLE 4

| | WHITE DISPLAY | | BLACK DISPLAY | | |
|---|---|---|---|---|---|
| | POS-ITIVE | NEG-ATIVE | POS-ITIVE | NEG-ATIVE | REMARKS |
| COUNTER ELECTRODE | 0 V | 3 V | 0 V | 3 V | |
| PIXEL ELECTRODE/ 2ND REFLECTIVE ELECTRODE | 3 V | 0 V | 0 V | 3 V | |
| 1ST REFLECTIVE ELECTRODE | 0 V | 3 V | 0 V | 3 V | POTENTIAL EQUAL TO POTENTIAL OF COUNTER ELECTRODE |
| | 3 V | 0 V | 3 V | 0 V | POTENTIAL EQUAL TO WHITE DISPLAY POTENTIAL |
| | | FLOATING 0 V | | FLOATING GROUND POTENTIAL | |

Embodiment 4

Figure 9:
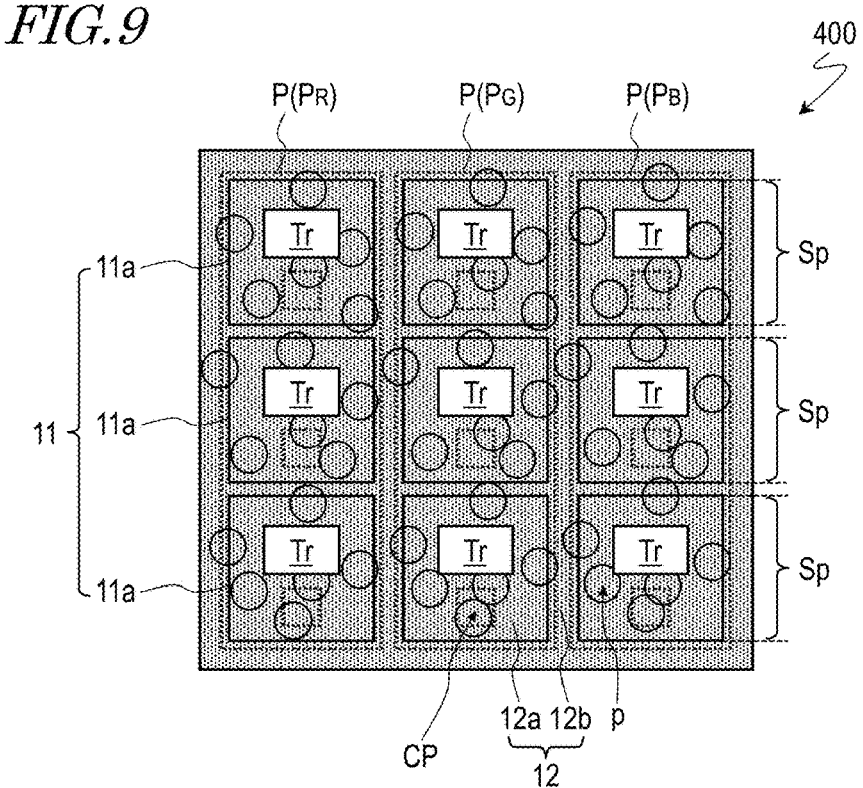
FIG. 9 is a plan view schematically showing still another liquid crystal display device 400 according to an embodiment of the present invention, and shows a region corresponding to three pixels P of the liquid crystal display device 400.

With reference to FIG. 9, a liquid crystal display device 400 in this embodiment will be described. FIG. 9 is a plan view schematically showing the liquid crystal display device 400, and shows a region corresponding to three pixels P of the liquid crystal display device 400. Hereinafter, differences of the liquid crystal display device 400 in this embodiment from the liquid crystal display device 300 in embodiment 3 will be mainly described.

The liquid crystal display device 400 is a transflective (transmissive and reflective) liquid crystal display device, unlike the liquid crystal display device 300 in embodiment 3. That is, as shown in FIG. 9, the pixels P of the liquid crystal display device 400 each include a transmissive region Tr providing display in a transmissive mode.

The transmissive region Tr does not overlap the contact portion CP. The transmissive region Tr is not light-shielded by the backplane circuit BP (that is, does not overlap any non-transparent electrode or wire in the backplane circuit BP).

Although not shown, in the liquid crystal display device 400 in this embodiment, the second reflective electrode 18 having the concaved and convexed surface structure is provided on the third interlayer insulating layer 17 so as to overlap the first contact hole CH1 and the second contact hole CH2 as seen in a direction normal to a display surface of the liquid crystal display device 400, like in the liquid crystal display device 300 in embodiment 3. This allows the regions where the first contact hole CH1 and the second contact hole CH2 are located to fully contribute to reflective display (that is, allows the regions to act as the reflective region Rf). Therefore, the invalid region Iv in the pixel P is substantially eliminated, and thus brighter display is realized.

The liquid crystal display device 400 in this embodiment was produced (example 4), and the effect of improving the brightness was investigated. Regarding example 4 and example 1, Table 5 shows the transmissive numerical aperture, the reflective numerical aperture, the white reflectance, the black reflectance, and the contrast ratio.

TABLE 5

| | TRANS-MISSIVE NUMERICAL APERTURE | REFLECTIVE NUMERICAL APERTURE | WHITE REFLEC-TANCE | BLACK REFLEC-TANCE | CON-TRAST RATIO |
|---|---|---|---|---|---|
| EX. 4 | 11.6% | 88.4% | 9.73% | 0.39% | 24.9 |
| EX. 1 | 11.6% | 84.2% | 9.27% | 0.38% | 24.4 |

As shown in Table 5, the reflective numerical aperture is about 1.05 times higher in example 4 than in example 1. Therefore, the white reflectance is about 1.05 times higher in example 4 than in example 1. The black reflectance is also higher in example 4 than in example 1 because the reflective numerical aperture is higher in example 4. However, the reflectance at the outermost surface of the liquid crystal display device is the same in example 4 and in example 1. Therefore, the black reflectance is merely about 1.03 times higher in example 3 than in example 1. As a result of the above, the contrast ratio is about 1.03 times higher in example 4 than in example 1.

Embodiment 5

Figure 10:
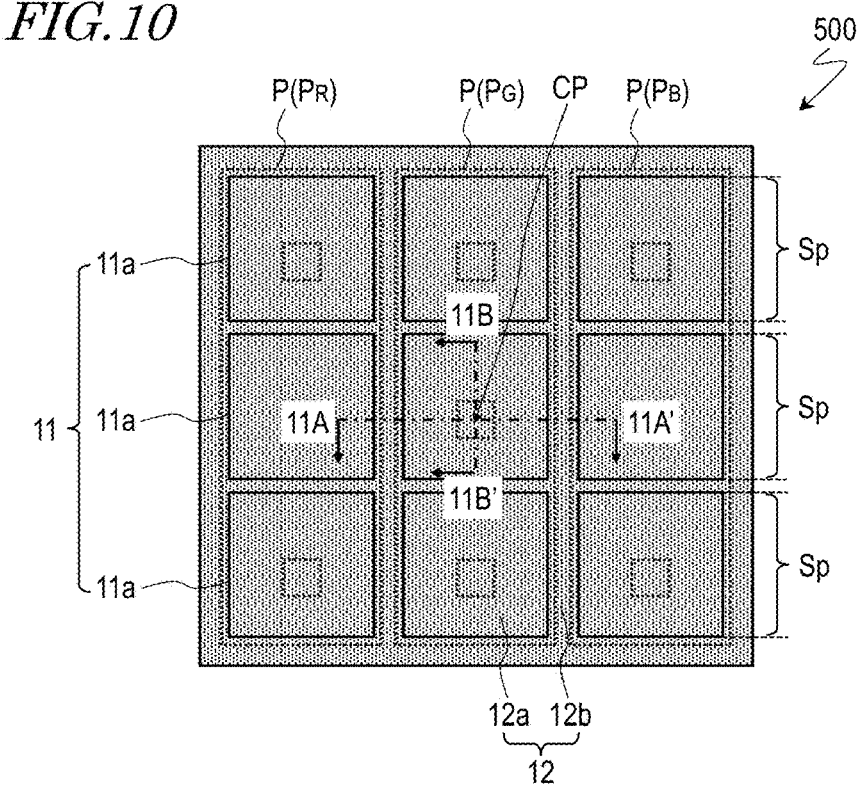
FIG. 10 is a plan view schematically showing still another liquid crystal display device 500 according to an embodiment of the present invention, and shows a region corresponding to three pixels P of the liquid crystal display device 500.
Figure 11A:
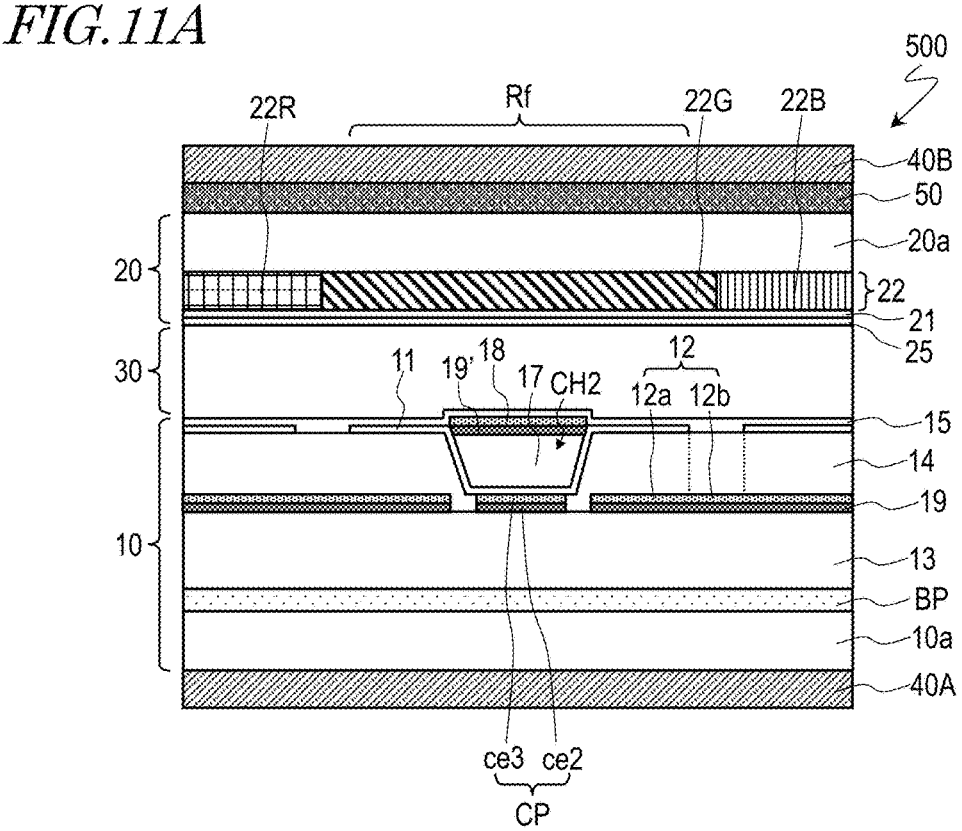
FIG. 11A is a cross-sectional view schematically showing the liquid crystal display device 500, and shows a cross-sectional structure taken along line 11A-11A' in FIG. 10.
Figure 11B:
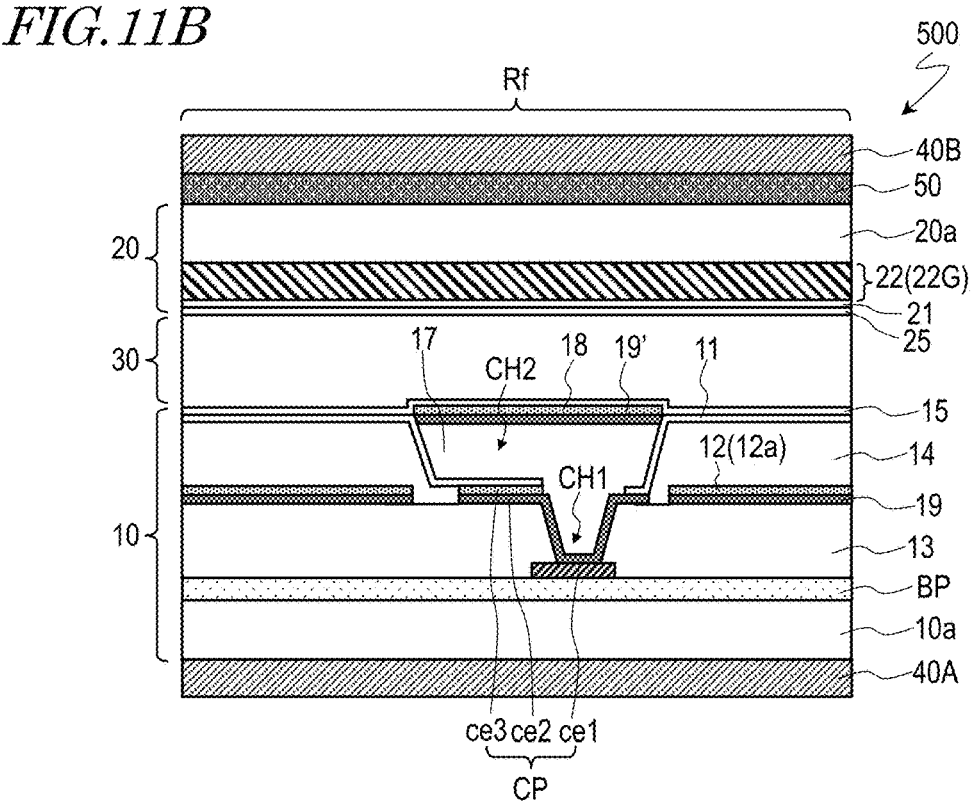
FIG. 11B is a cross-sectional view schematically showing the liquid crystal display device 500, and shows a cross-sectional structure taken along line 11B-11B' in FIG. 10.

With reference to FIG. 10, FIG. 11A and FIG. 11B, a liquid crystal display device 500 in this embodiment will be described. FIG. 10 is a plan view schematically showing the liquid crystal display device 500, and shows a region corresponding to three pixels P of the liquid crystal display device 500. FIG. 11A and FIG. 11B are cross-sectional views schematically showing the liquid crystal display device 500, and respectively show cross-sectional structures taken along line 11A-11A' and line 11B-11B' in FIG. 10. Hereinafter, differences of the liquid crystal display device 500 in this embodiment from the liquid crystal display device 300 in embodiment 3 will be mainly described.

In the liquid crystal display device 500, the first reflective electrode 12 and the second reflective electrode 18 are respectively formed on the first interlayer insulating layer 13 and the second interlayer insulating layer 14 that do not have a concaved and convexed shape (namely, that are flat). Therefore, neither the first reflective electrode 12 nor the second reflective electrode 18 has a concaved and convexed surface structure, and the first reflective electrode 12 and the second reflective electrode 18 each act as a mirror reflective layer.

The liquid crystal display device 500 further includes a light scattering layer 50 located on a viewer side with respect to the liquid crystal layer 30. The light scattering layer 50 is, for example, an anisotropic light scattering film. In the example shown in FIG. 11A and FIG. 11B, the light scattering layer 50 is located between the substrate 20a and the second circularly polarized plate 40B. In this embodiment, the light scattering layer 50 scatters light, and as a result, display close to paper white is realized.

In the liquid crystal display device 500 in this embodiment, a combination of the second reflective electrode 18 and the light scattering layer 50 allows the regions where the first contact hole CH1 and the second contact hole CH2 are located to fully contribute to reflective display. This realizes still brighter display.

Embodiments of the present invention are widely applicable for liquid crystal display devices including pixels each of which includes a reflective region providing display in a reflective mode (namely, a reflective liquid crystal display device and a transflective liquid crystal display device).

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2021-113380 filed on Jul. 8, 2021 and No. 2022-090705 filed on Jun. 3, 2022, the entire contents of which are hereby incorporated by reference.

What is claimed is:

1. A liquid crystal display device, comprising:
a first substrate;
a second substrate facing the first substrate; and
a vertical alignment-type liquid crystal layer provided between the first substrate and the second substrate,
the liquid crystal display device including a plurality of pixels arranged in a matrix including a plurality of rows and a plurality of columns,
wherein the plurality of pixels each include a reflective region providing display in a reflective mode,
wherein the first substrate includes:
a substrate,
a backplane circuit provided on the substrate, the backplane circuit driving the plurality of pixels,
a first interlayer insulating layer provided so as to cover the backplane circuit,
a first reflective electrode provided on the first interlayer insulating layer, the first reflective electrode including a first region located in each of the plurality of pixels and a second region located between any two pixels adjacent to each other among the plurality of pixels,
a second interlayer insulating layer provided so as to cover the first reflective electrode, and
a pixel electrode formed of a transparent conductive material, the pixel electrode being provided on the second interlayer insulating layer in each of the plurality of pixels,
wherein the pixel electrode is electrically connected with the backplane circuit in a first contact hole formed in the first interlayer insulating layer and a second contact hole formed in the second interlayer insulating layer, and
wherein the first substrate further includes a second reflective electrode provided on the second interlayer insulating layer so as to overlap the first contact hole as seen in a direction normal to a display surface.

2. The liquid crystal display device of claim 1, wherein the first reflective electrode has a concaved and convexed surface structure in each of the first region and the second region.

3. The liquid crystal display device of claim 2, wherein the second reflective electrode has a concaved and convexed surface structure.

4. The liquid crystal display device of claim 1, further comprising a light scattering layer located on a viewer side with respect to the liquid crystal layer.

5. The liquid crystal display device of claim 4, wherein neither the first reflective electrode nor the second reflective electrode has a concaved and convexed surface structure.

6. The liquid crystal display device of claim 5,
wherein the first substrate further includes a third reflective electrode provided on the first interlayer insulating layer so as to overlap the second contact hole as seen in the direction normal to the display surface, and
wherein the third reflective electrode does not have a concaved and convexed surface structure.

7. The liquid crystal display device of claim 1, wherein the second reflective electrode is electrically connected with the pixel electrode.

8. The liquid crystal display device of claim 1,
wherein each of the plurality of pixels further includes a transmissive region providing display in a transmissive mode, and
wherein a portion of the pixel electrode is located in the transmissive region.

9. The liquid crystal display device of claim 1, wherein the backplane circuit includes a memory circuit connected with each of the plurality of pixels.

10. A liquid crystal display device, comprising:
a first substrate;
a second substrate facing the first substrate; and
a vertical alignment-type liquid crystal layer provided between the first substrate and the second substrate,
the liquid crystal display device including a plurality of pixels arranged in a matrix including a plurality of rows and a plurality of columns,
wherein the plurality of pixels each include a reflective region providing display in a reflective mode,
wherein the first substrate includes:
a substrate,
a backplane circuit provided on the substrate, the backplane circuit driving the plurality of pixels,
a first interlayer insulating layer provided so as to cover the backplane circuit,
a first reflective electrode provided on the first interlayer insulating layer, the first reflective electrode including a first region located in each of the plurality of pixels and a second region located between any two pixels adjacent to each other among the plurality of pixels,
a second interlayer insulating layer provided so as to cover the first reflective electrode, and
a pixel electrode formed of a transparent conductive material, the pixel electrode being provided on the second interlayer insulating layer in each of the plurality of pixels,
wherein the pixel electrode is electrically connected with the backplane circuit in a first contact hole formed in the first interlayer insulating layer and a second contact hole formed in the second interlayer insulating layer, and wherein the first substrate further includes:
- a third interlayer insulating layer provided in the second contact hole, and
- a second reflective electrode provided on the third interlayer insulating layer so as to overlap at least the second contact hole as seen in a direction normal to a display surface.

11. The liquid crystal display device of claim 10,
wherein the second contact hole and the third interlayer insulating layer overlap the first contract hole as seen in the direction normal to the display surface, and
wherein the second reflective electrode also overlaps the first contact hole as seen in the direction normal to the display surface.

12. The liquid crystal display device of claim 10, wherein the first reflective electrode has a concaved and convexed surface structure in each of the first region and the second region.

13. The liquid crystal display device of claim 12, wherein the second reflective electrode has a concaved and convexed surface structure.

14. The liquid crystal display device of claim 10, further comprising a light scattering layer located on a viewer side with respect to the liquid crystal layer.

15. The liquid crystal display device of claim 14, wherein neither the first reflective electrode nor the second reflective electrode has a concaved and convexed surface structure.

16. The liquid crystal display device of claim 10, wherein the second reflective electrode is electrically connected with the pixel electrode.

17. The liquid crystal display device of claim 10, wherein the plurality of pixels each include a transmissive region providing display in a transmissive mode.

18. The liquid crystal display device of claim 17 wherein the transmissive region is not light-shielded by the backplane circuit.

19. The liquid crystal display device of claim 10, wherein the backplane circuit includes a memory circuit connected with each of the plurality of pixels.

* * * * *